United States Patent
Cragun et al.

(10) Patent No.: US 10,140,102 B2
(45) Date of Patent: Nov. 27, 2018

(54) EVALUATING ACCESSIBILITY COMPLIANCE OF A HYBRID USER INTERFACE DESIGN

(71) Applicant: International Business Machines Corporation, Armonk, NY (US)

(72) Inventors: Brian J. Cragun, Rochester, MN (US); Puthukode G. Ramachandran, Austin, TX (US); Shunguo Yan, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 478 days.

(21) Appl. No.: 14/465,058

(22) Filed: Aug. 21, 2014

(65) Prior Publication Data

US 2016/0054985 A1   Feb. 25, 2016

(51) Int. Cl.
*G06F 9/44* (2018.01)
*G06F 11/36* (2006.01)
*G06F 8/38* (2018.01)
*G06F 8/20* (2018.01)
*G06F 17/30* (2006.01)

(52) U.S. Cl.
CPC ............ *G06F 8/38* (2013.01); *G06F 11/36* (2013.01); *G06F 8/20* (2013.01); *G06F 17/30126* (2013.01)

(58) Field of Classification Search
None
See application file for complete search history.

(56) References Cited

U.S. PATENT DOCUMENTS

| | | | |
|---|---|---|---|
| 7,143,042 B1 * | 11/2006 | Sinai | G10L 15/22 704/270.1 |
| 8,060,863 B2 | 11/2011 | Brunswig et al. | |
| 8,196,104 B2 | 1/2012 | Cohrs et al. | |
| 8,543,986 B2 | 9/2013 | Murthy et al. | |
| 8,566,648 B2 | 10/2013 | Schroeder | |
| 8,826,240 B1 * | 9/2014 | Lachwani | G06F 8/30 714/38.1 |
| 9,071,518 B2 | 6/2015 | Malik et al. | |
| 2004/0064593 A1 * | 4/2004 | Sinclair | G06F 9/4443 709/250 |

(Continued)

OTHER PUBLICATIONS

Apple Inc; Verifying App Accessibility on iOS, Apr. 23, 2013.

(Continued)

*Primary Examiner* — David T. Brooks
(74) *Attorney, Agent, or Firm* — Garg Law Firm, PLLC; Rakesh Garg; Mercedes L. Hobson

(57) ABSTRACT

A first hierarchy of a first type of elements of a user interface is received from an application. A second application presents the user interface including a set of the first type of elements and a set of a second type of elements at a client. A second hierarchy of the second type of elements used in a system-specific presentation of the user interface is received from the application. A first element of the first type in the first hierarchy is determined to violate a condition specified in a compliance rule, and that a second element of the second type in the second hierarchy is related to the first element. An evaluation is made that an attribute of the second element causes the condition to be violated. The second element is reported.

20 Claims, 12 Drawing Sheets

(56) References Cited

U.S. PATENT DOCUMENTS

| | | | | |
|---|---|---|---|---|
| 2006/0195819 | A1* | 8/2006 | Chory | G06F 17/3089 717/117 |
| 2006/0277250 | A1* | 12/2006 | Cherry | H04L 67/02 709/203 |
| 2007/0074167 | A1* | 3/2007 | Cohrs | G06F 11/3672 717/124 |
| 2007/0234308 | A1* | 10/2007 | Feigenbaum | G06F 8/316 717/130 |
| 2009/0300709 | A1 | 12/2009 | Chen et al. | |
| 2010/0268809 | A1* | 10/2010 | Ganesh | G06Q 30/02 709/223 |
| 2012/0077546 | A1 | 3/2012 | Kawa et al. | |
| 2013/0046794 | A1* | 2/2013 | De Magalhaes | G06F 17/30961 707/797 |
| 2013/0191811 | A1 | 7/2013 | Peck et al. | |
| 2014/0136945 | A1* | 5/2014 | Ligman | G06F 17/2247 715/234 |
| 2014/0245169 | A1* | 8/2014 | Feng | H04L 67/306 715/745 |
| 2014/0344732 | A1 | 11/2014 | Kastrinogiannis et al. | |
| 2014/0351796 | A1* | 11/2014 | Gur-esh | G06F 11/3644 717/126 |
| 2014/0366005 | A1 | 12/2014 | Kozhuharov et al. | |

OTHER PUBLICATIONS

Android; Android Lint, Nov. 15, 2015.
Eclipse Foundation; Accessibility Tools Framework (ACTF), 2015.
Karasiewicz, Selecting a Mobile UI Framework, Aug. 28 2013.
Kipar, Test Automation for Mobile Hybrid Applications, 40 pages, May 20, 2014.
IOS, Automating UI Testing, https://developer.apple.com/library/IOs/documentation/DeveloperTools/Conceptual/InstrumentsUserGuide/UsingtheAutomationInstrument/UsingtheAutomationInstrument.html, 2014.
Android, UI Testing, http://developer.android.com/tools/testing/testing_ui.html, 2014.
Apple Inc., About accessibility verification on IOS, 2013.
Jus; Beyond Specifications: Towards a Practical Methodology for Evaluating Web Accessibility, vol. 5, Issue Aug. 2010, pp. 157-171.
Springer Link; People with disabilities: automatic and manual evaluation of web sites, vol. 4061, 2006, pp. 152-155.
IBM; RAtional Policy Tester Accessibility Edition, Aug. 19, 2014.
Abascal, Julio, et al. "The use of guidelines to automatically verify Web accessibility." Universal Access in the Information, Society 3.1 (2004): 71-79.
Appendix P, Nov. 18, 2015.
Appendix P.
IOS, Automating UI Testing, https://developer.apple.com/library/IOs/documentation/DeveloperTools/Conceptual/InstrumentsUserGuide/UsingtheAutomationInstrument/UsingtheAutomationInstrument.html.
Android, UI Testing, http://developer.android.com/tools/testing/testing_ui.html.
Accessibility inspector for iOS.
Web accessibility checkers (e.g., Rational Policy Tester, or RPT, Accessibility checkers from SSB Bart and Deque).
Beyond Specifications: Towards a Practical Methodology for Evaluating Web Accessibility.
People with disabilities: automatic and manual evaluation of web sites.

* cited by examiner

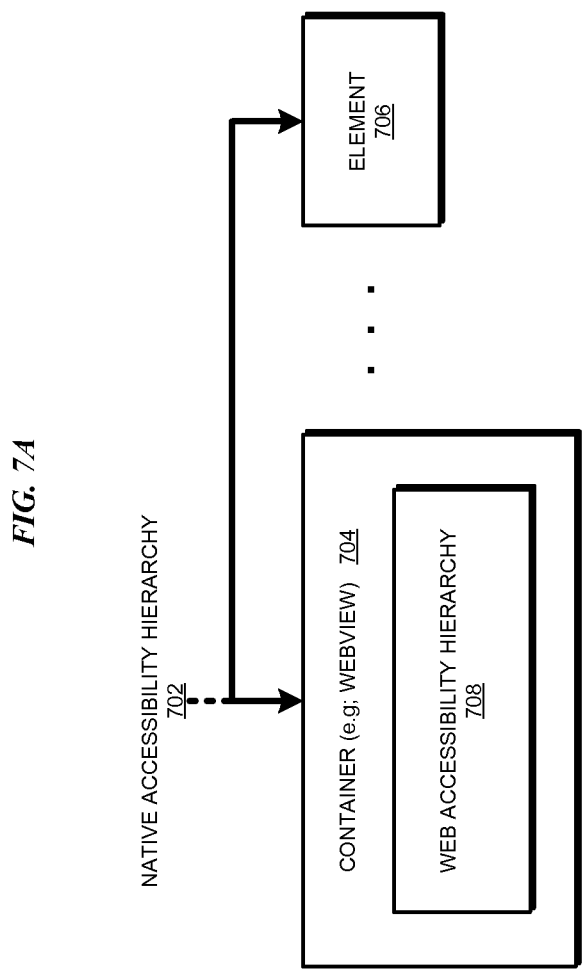

EVALUATING ACCESSIBILITY COMPLIANCE OF A HYBRID USER INTERFACE DESIGN

TECHNICAL FIELD

The present invention relates generally to a method, system, and computer program product for evaluating the user interfaces used on computing devices. More particularly, the present invention relates to a method, system, and computer program product for evaluating accessibility compliance of a hybrid user interface design.

BACKGROUND

Almost all data processing systems, including mobile devices, include some manner of interacting with a user. For example, a display device is used with a data processing system for presenting a visual user interface to a user, an audio device is used with the data processing system for presenting audible user interface to the user, and tactile devices are used for presenting a tactile interface to the user. Within the scope of the disclosure, the term "user interface" refers to a user interface of any of these types or other types as may be suitable for a particular implementation.

Accessibility features are features of a user interface that are designed or configured to assist a user in interacting with a particular aspect of a given user interface. For example, a large default font size is an example accessibility feature that makes interacting with a user interface easier for those users who have weak eyesight. Similarly, an audio readout accessibility feature assists users with vision impairment to interact with a user interface. A tactile feedback, such as vibration of a mobile device, is another example accessibility feature for users who have temporary, circumstantial, or permanent auditory impairment. Such features benefit users experiencing impairments, whether temporary, circumstantial, preferential, or permanent.

Many accessibility features are presently available for use in user interface designs. Often, an application executing on a data processing system presents several user interfaces to the user during the course of using the application. For example, numerous user interfaces in the forms of screen layouts, plugin applications, and tools are presented or called upon during the course of a user using a software application.

SUMMARY

The illustrative embodiments provide a method, system, and computer program product for evaluating accessibility compliance of a hybrid user interface design. An embodiment includes a method for evaluating compliance of a hybrid user interface design. The embodiment receives, from a first application executing in a client data processing system, a first hierarchy of a first type of elements of a user interface, wherein a second application presents the user interface including a set of the first type of elements and a set of a second type of elements at the client data processing system. The embodiment receives, from the first application, a second hierarchy of the second type of elements used in a system-specific presentation of the user interface at the client data processing system. The embodiment determines that a first element of the first type in the first hierarchy violates a condition specified in a compliance rule. The embodiment determines that a second element of the second type in the second hierarchy is related to the first element. The embodiment evaluates that an attribute of the second element causes the condition to be violated. The embodiment reports, responsive to the evaluating, the second element as the cause of violating the condition.

Another embodiment includes a computer usable program product comprising a computer readable storage device including computer usable code for evaluating compliance of a hybrid user interface design. The embodiment further includes computer usable code for receiving, from a first application executing in a client data processing system, a first hierarchy of a first type of elements of a user interface, wherein a second application presents the user interface including a set of the first type of elements and a set of a second type of elements at the client data processing system. The embodiment further includes computer usable code for receiving, from the first application, a second hierarchy of the second type of elements used in a system-specific presentation of the user interface at the client data processing system. The embodiment further includes computer usable code for determining that a first element of the first type in the first hierarchy violates a condition specified in a compliance rule. The embodiment further includes computer usable code for determining that a second element of the second type in the second hierarchy is related to the first element. The embodiment further includes computer usable code for evaluating that an attribute of the second element causes the condition to be violated. The embodiment further includes computer usable code for reporting, responsive to the evaluating, the second element as the cause of violating the condition.

Another embodiment includes a data processing system for evaluating compliance of a hybrid user interface design. The embodiment further includes a storage device, wherein the storage device stores computer usable program code. The embodiment further includes a processor, wherein the processor executes the computer usable program code. The embodiment further includes computer usable code for receiving, from a first application executing in a client data processing system, a first hierarchy of a first type of elements of a user interface, wherein a second application presents the user interface including a set of the first type of elements and a set of a second type of elements at the client data processing system. The embodiment further includes computer usable code for receiving, from the first application, a second hierarchy of the second type of elements used in a system-specific presentation of the user interface at the client data processing system. The embodiment further includes computer usable code for determining that a first element of the first type in the first hierarchy violates a condition specified in a compliance rule. The embodiment further includes computer usable code for determining that a second element of the second type in the second hierarchy is related to the first element. The embodiment further includes computer usable code for evaluating that an attribute of the second element causes the condition to be violated. The embodiment further includes computer usable code for reporting, responsive to the evaluating, the second element as the cause of violating the condition.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 7A depicts a block diagram of an example way of representing elements of a hybrid UI in accordance with an illustrative embodiment;

DETAILED DESCRIPTION

Figure 1:
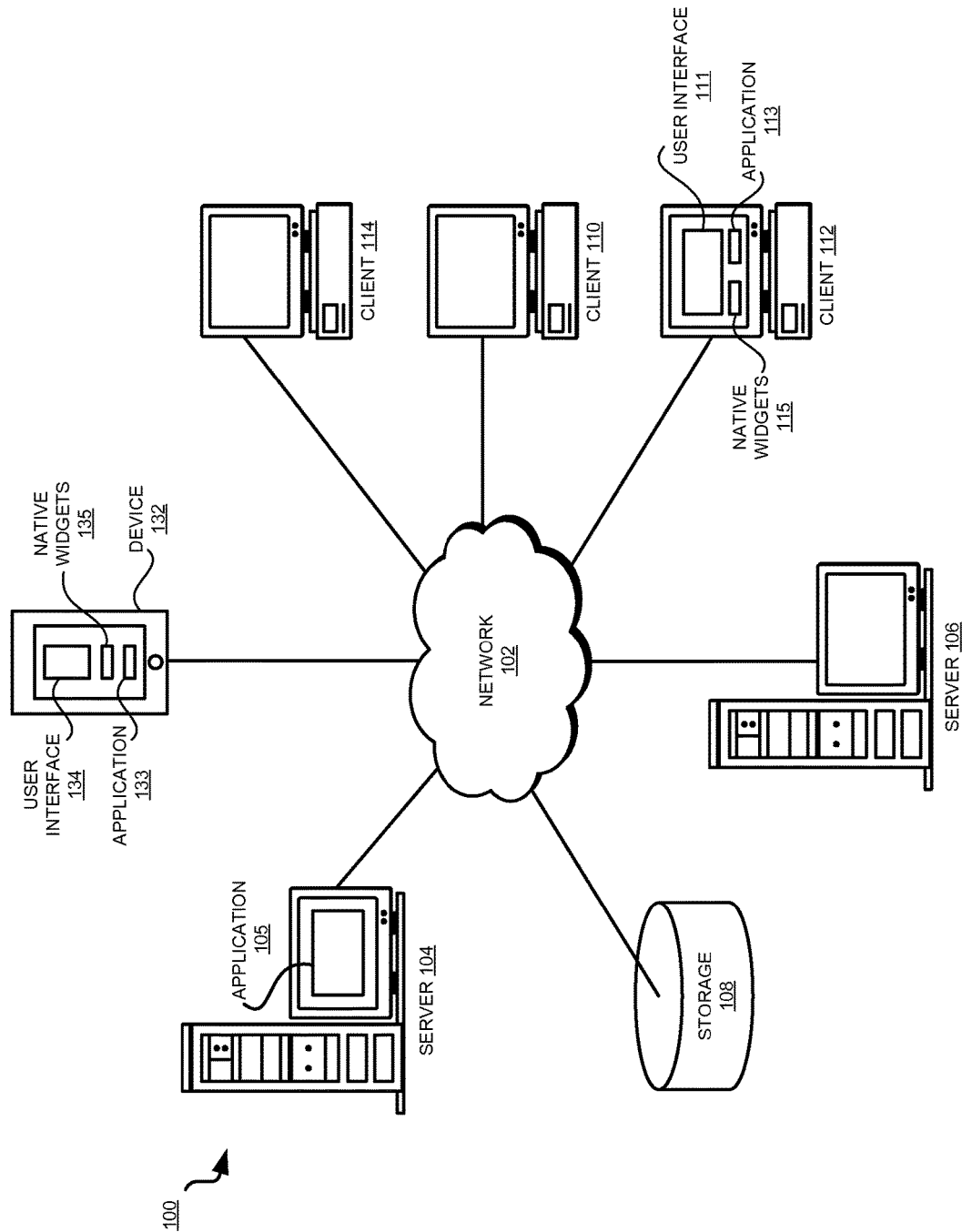
FIG. 1 depicts a block diagram of a network of data processing systems in which illustrative embodiments may be implemented.

Within the scope of this disclosure, the term "accessibility" includes not only the considerations in making a user interface usable despite some disability, but also considerations for improving the usability of a user interface generally. To such end, the term "accessibility" is inclusive of other terms, such as "usability".

An element of a user interface (UI) is a part, portion, or component used in the UI. A UI element is often, but need not necessarily be, visible or perceptible to a user. A UI element has associated therewith a set of one or more attributes. A UI element can depend on or relate to another UI element such that an attribute of the UI element is changed, restricted, overridden, controlled, limited, manipulated, guided, or otherwise affected by an attribute of the related UI element. An accessibility feature of a UI is a result of adding, removing, or modifying one or more elements of the UI, adjusting one or more attributes of the one or more elements of the UI, or a combination thereof.

The illustrative embodiments recognize that accessibility features of a UI are largely implementation dependent, and are generally decided by software manufacturers and software developers. Standards and specifications for some accessibility features presently exist, with new accessibility features and their specifications evolving with the advancement of technology.

The illustrative embodiments further recognize that a UI is also dependent upon the hardware platform, hardware-software combination, or both, (collectively, hereinafter, "native infrastructure") on which the UI is to be presented. For example, a UI that is to be presented on a device using iOS™ can, and often does, implement UI elements differently from an implementation of the same UI elements for the Android™ platform (iOS is a trademark of Cisco Systems, Inc. licensed to Apple Inc., and Android is a trademark of Google Inc., in the United States and in other countries).

A native widget is any component of a given native infrastructure that contributes, controls, affects a native element, or otherwise causes a native element to be manipulated. A native element is a UI element that is implemented in the native infrastructure, independent of particular UIs that are presented on the given native infrastructure.

By comparison, a non-native element is a UI element that is specific to the particular UI that is presented on one or more types of native infrastructures. Only as an example and without implying any limitations thereto on the illustrative embodiments, assume that an example UI is implemented in HyperText Markup Language (HTML, html). A page in the UI is implemented using a variety of html elements, such as the page, forms, tables, buttons, radio-buttons, slider-control, checkboxes, text fields, labels, and the like. An html element such as a table, is coded in html such that relative to other elements on the UI page, the table element is presented in a similar manner when the page is presented on any given native infrastructure.

In continuation of the same example, assume that the native infrastructure comprises iOS platform. A native element in that native infrastructure is webView, which implements methods for accessing native resources available in that native infrastructure, e.g., hardware components in the iOS device, software services in the iOS operating system, and the like. The webView native element implements a browser therein, using which UI of web pages can be presented.

Many other types of native elements are possible and are contemplated within the scope of the illustrative embodiments. For example, a button artifact on a user interface can be a native element as well, such as a "Home" button, a "start" button, a "back" button, and so on. Slider controls, checkboxes, and other graphical artifacts can be present as native elements, non-native elements, or both, on a user interface in a similar manner.

The illustrative embodiments recognize that the manner in which the html elements of a given page are eventually presented on a particular device can be influenced or affected by how the native elements are implemented on that device's native infrastructure. For example, if a native element defines a size or coordinates of a display area, the html table presented within that display area may or may not require scrolling. As another example, if a native element defines a background color, the color scheme of an html element, e.g., a form, may be overridden. As another example, if a native element is a button graphic, an html element that is a different button graphic in webView, when presented using the native infrastructure, may appear closer than a threshold distance from the native button element.

Only for the clarity of the description and not to imply any limitation on the illustrative embodiments, hereinafter in the disclosure, operations and features related to non-native elements are interchangeably referred to as web elements. Any reference to a web element or an organization thereof is similarly applicable to other types of non-native elements or organizations thereof within the scope of the illustrative embodiments.

Presently, verifying compliance of an accessibility feature with a specification is also dependent upon the participation of the software manufacturer, the software developer, one or more entities involved in the development of a native infrastructure, and/or the user. For example, some software manufacturers include accessibility testing as a part of software testing activity and include an accessibility compliance report generated therefrom with the software. Some other software products are distributed with manufacturer-supplied accessibility testing tools bundled with the software. Some entities test native infrastructure for accessibility compliance or provide testing tools for such testing.

The illustrative embodiments recognize that because of such disconnected and diverse ways of testing or checking for accessibility compliance, the presently available methods for accessibility compliance checking are non-uniform across applications. The illustrative embodiments further recognize that the presently available accessibility compliance checking methods are static, to wit, they check for accessibility compliance according to the accessibility compliance rules existing at the time the packaged report or tool was created, according to the accessibility compliance rules controlled by manufacturers or developers, and according to a manner of applying those accessibility compliance rules selected by the manufacturer or developer.

Many accessibility features depend on, or are a result of rules. For example, a rule interpreted from a government law, an industrial standard, a usability specification, or industry best practice often forms a basis for an accessibility feature.

The illustrative embodiments recognize that many entities can contribute accessibility compliance rules at any given time. For example, different standards bodies can promulgate or recommend different sets of accessibility compliance rules as applicable to different accessibility features, different geographical locales, different devices or technological components involved, government or governing regulations, and many other factors. As another example, an association of interested parties, e.g. an association of software manufacturers, software developers, users, device manufacturers, native infrastructure developers, or public interest groups, can similarly contribute one or more sets of accessibility compliance rules, policies, preferences, guidelines, or recommendations. An accessibility compliance rule, policy, preference, guideline, regulation, recommendation, or specification is collectively referred to herein as an accessibility compliance rule or simply a rule.

Furthermore, such sets of rules can be overlapping, can have an order of preference or application, can have different effective periods, can be provided in different forms, and can be differently applicable or not applicable according to circumstances. Additionally, an entity may wish to add supplementary rules, prioritize certain rules, or choose to ignore other rules generally or in certain conditions. Various rule sets may also apply differently depending on device usage, markets, or device capabilities. The illustrative embodiments recognize that the presently available methods of accessibility compliance checking are not conducive to making an on-demand, unbiased, comprehensive, current, and selective accessibility compliance check of a UI.

Depending on its nature, an accessibility feature can be statically created on an interface during the design of the interface, or dynamically added to the interface during running of a program on a native infrastructure, a result generated from a program logic, or based on input from a user. Regardless of how created, an accessibility feature has to be tested as a part of testing the overall UI and in the context of other features of the UI, e.g., by testing the effects of the accessibility feature on other native and non-native elements.

Testing UIs presently requires laborious manual testing by persons with special training. Not only can such testing methods be expensive, such presently used testing methods frustrate modern coding practices such as Agile and Continuous Delivery, which are designed to take advantage of automated testing methods. Further, while there are compliance checking tools for the HTML-based application which analyze the page using the page structure of the document object model (DOM), the technology doesn't work for the applications that are directly created from a object language (such as C, Objective-C or Java™) in which the source code or compiled binary cannot be directly used for accessibility evaluation. Such presently available technology is also insufficient for checking accessibility compliance dynamically, to wit, as the native platforms change, as the UI is presented on different native infrastructures, or as UI elements are affected during the presentation due to the underlying native infrastructure operations.

The illustrative embodiments used to describe the invention generally address and solve the above-described problems and other problems related to accessibility compliance checking of UI features. The illustrative embodiments provide a method, system, and computer program product for evaluating accessibility compliance of a hybrid user interface design.

An embodiment constructs one or more hierarchies of elements of a UI dynamically during the running of a program, identifying in the one or more hierarchies any accessibility attributes associated with the elements represented therein. For example, an embodiment constructs one hierarchy for web elements in a given UI. The embodiment constructs another for native elements used by the UI, native elements affecting the web elements in the UI, native elements affected by the web elements of the UI, or some combination thereof.

In one embodiment, the construction of a hierarchy is responsive to detecting an event on a data processing system, such as in a native infrastructure. For example, one embodiment detects a launch of an application on a data processing system to identify a UI that is presented as a result of the launch. Another embodiment detects a change of the UI, e.g., a change in the layout or composition of an existing UI resulting from a user action, a system action, a transaction, or a computation. Another embodiment detects a change of the UI due to an update to the HTML page in a webView as a result of running a Java script. Generally, any manner of identifying a UI is response to any type of event is contemplated within the scope of the illustrative embodiments.

An embodiment constructs the hierarchy using a description of the UI. For example, an application designed to run on Android platform may use a layout description file in eXtensible Markup Language (XML) that specifies how the interface should appear on the screen of a user device. Such description identifies various native elements and their attributes present in the UI. While some such descriptions may include a web view that can be used to host a hierarchy of the web elements of their own, a hierarchy of web elements for accessibility compliance according to an embodiment is distinct from such hierarchy in the description of the UI. For example, an embodiment constructs a hierarchy of web elements using DOM corresponding to a web page that is loaded, or is to be loaded. DOM and web page are described only as examples without limiting the illustrative embodiments thereto. Other suitable forms of a document that is loaded, or is to be loaded, including the examples of DOM and web pages but not limited thereto, are also usable to provide the information that is usable for constructing a hierarchy of non-native elements in a similar manner.

For example, the web view may initially load only a div, a script, and a style element. But during a user interaction, as a result of running a Java script and applying the styles, a hierarchy of a large set of web elements according to an order of use on the UI, are created. The creation may be followed by different accessibility hierarchies being created according to the web UI changes. An accessibility hierarchy according to an embodiment regroups, reclassifies, replicates, or otherwise reorganizes the web elements according to common properties in subsets of the web elements, thereby making the embodiment's hierarchy distinct from the hierarchy of the UI elements. As another example, a hierarchy according to an embodiment omits certain web elements appearing in the hierarchy in the description when those web elements are known or determined to be irrelevant to accessibility features, thereby making the embodiment's hierarchy distinct from the hierarchy of the UI description.

As another example, the hierarchy may include a hierarchy of a set of only those web elements that are present in the UI but not the web elements that are resolved, created, or presented as a result of a run-time activity on the UI. A hierarchy according to an embodiment explores such unidentified or run-time web elements, and includes them in the hierarchy, thereby making the embodiment's hierarchy distinct from the hierarchy of the UI description. Some examples of such web elements are controls on an audio or video plugin that is called when the user interacts with audio or video content, and controls or features on a magnification tool or a utility that is activated in response to a user interaction with a control or content on the UI. A hierarchy may include other attributes (such as screen coordinate of a web element) necessary to determine or markup a web element to be included in the accessibility report. A hierarchy may also include calculated attributes for a web element from a hierarchical structure, for example, color contrast for a layered view structures such as a button with a label or an image button.

In a similar manner, an embodiment constructs a hierarchy of native elements and their corresponding attributes. For constructing a hierarchy of the native elements an embodiment can use, but is not limited to using, information available or discoverable from the native infrastructure, documentation available from a native infrastructure developer, or a combination of these and other sources. Furthermore, the hierarchy of native elements constructed by an element for accessibility compliance checking purposes is distinct from any express or implied hierarchy of UI elements that may be available from such sources for similar reasons as described above with respect to the hierarchy of web elements.

When the disclosure refers to an "element" and not specifically to a "web element", "non-native element", or "native element", that portion of the disclosure is intended to be applicable to non-native element and native element in a similar manner, unless specifically described otherwise in that portion.

A container element includes or 'contains' other elements. A container element can include one or more other container elements, one or more elements, or a combination thereof. Furthermore, a container element can contribute, change, control, limit, restrict, modify, affect, or otherwise manipulate or cause to be manipulated another element in another hierarchy without containing or including the other element of the other hierarchy. For example, a webView element is a native container element. The webView element also influences the entire hierarchy of web elements of an html UI contained in the webView container, which is presented within the display artifact corresponding to the webView container element on a given native infrastructure.

A native container element can include other native elements in a hierarchy of native elements. For example, in some implementations, the webView container element can include other native elements that may be presented relative to other native or non-native elements presented in the UI in the webView.

For accessibility compliance checking an embodiment constructs a hierarchy of elements for nested or structured elements of the UI as well. For example, when a UI includes a container element in a parent-child relationship with one or more contained elements, an embodiment traverses such containers to the lowest level contained elements. For insertion into the hierarchy according to an embodiment, the embodiment considers not only the attributes associated with the lowest level contained element but also the attributes available at the element by inheritance from one or more parent container elements of the UI.

When cross-hierarchy elements influence each other, such as in the webView container element example above, for an element in a hierarchy, an embodiment further notes the accessibility attributes of the influencing element from the other hierarchy. In one embodiment, such notation of accessibility attributes of the influencing elements is only a reference to the influencing element. In another embodiment, such notation is an inclusion of or a reference to the specific accessibility attributes of the influencing element of the other hierarchy. In another embodiment, such notation further includes a description or indication of a nature or type of relationship between the element of the hierarchy and the influencing element of the other hierarchy.

In addition to constructing a hierarchy of web elements, an embodiment further associates a screenshot of the UI with the hierarchy to assist identification, recognition, or markup of a web element in the accessibility hierarchy.

Another embodiment receives the hierarchy constructed in any of these manners for evaluating accessibility compliance. In one implementation, such an embodiment is implemented in a server computer and receives the hierarchy from another embodiment executing in a client computer or device. In another implementation, the server computer is a part of a cloud computing environment. In another implementation, the embodiment that receives the hierarchy and performs the compliance evaluation is configured as a service available from a server or a cloud, and usable by a variety of client applications, client devices, client operating systems, and generally any type of client environment.

Regardless of how and where implemented, an embodiment can be implemented such that a single instance performs the accessibility compliance checking of a native hierarchy and a non-native hierarchy. Another embodiment can be implemented such that one instance performs the accessibility compliance checking of a native hierarchy and another of a non-native hierarchy.

An embodiment for compliance evaluation accesses a set of accessibility compliance rules in a repository. For example, an embodiment evaluating accessibility compliance of a hierarchy of non-native elements (non-native hierarchy) uses a set of accessibility compliance rules that are applicable to the non-native elements, e.g., html elements. Similarly, an embodiment evaluating accessibility compliance of a hierarchy of native elements (native hierarchy) uses a set of accessibility compliance rules that are applicable to the native elements, e.g., elements operating to present a UI in the iOS environment. Furthermore, a repository can store and provide the accessibility compliance rules that are applicable to the non-native elements, the accessibility compliance rules that are applicable to the native elements, or both.

Any number of entities can contribute to any number of repositories, any number and types of accessibility compliance rules, at any time, in any combination, and with any restrictions or conditions on their use. The embodiment selects one or more rules according to a user profile, an application profile, a native infrastructure profile, a standard, or a combination thereof.

For example, a normalized profile for users with certain disabilities can help select certain rules but not others such that the selected rules test the compliance of the accessibility features relevant to the disability. Similarly, an application profile can select those rules that check for compliance of accessibility features commonly found in applications or native-infrastructures fitting that profile, and not others. Profile-based rule selection is optional in an embodiment to optimize evaluation time, cost, or user-experience.

An embodiment determines whether one or more elements in received hierarchy meet, exceed, or fail an accessibility specification according to a selected rule. One embodiment generates an accessibility compliance report that includes reports of elements that fail the compliance evaluation. Another embodiment generates an accessibility compliance report that includes reports of elements that pass the compliance evaluation as well as the elements that fail the compliance evaluation.

Another embodiment generates an accessibility compliance report that includes reports of elements that fail the compliance evaluation along with a severity of the failure. For example, non-compliance of one element may be acceptable in a given situation whereas non-compliance of another element may not. In some cases, a warning about the non-compliance of an element may be sufficient, and in other cases, a notification about a possible non-compliance may be warranted. As another example, non-compliance of an element in one attribute of accessibility may indicate one level of severity or consequences whereas non-compliance of an element in another attribute of accessibility, or in more than a threshold number of attributes, may indicate another level of severity or consequences.

An embodiment further generates an accessibility compliance report that includes reports of elements that fail the compliance evaluation along with a recommended remedy for curing the failure. For example, an accessibility specification may specify a remedy for a failure condition. An embodiment matches the condition why an element failed accessibility compliance evaluation with such failure condition, and recommends the corresponding remedy in the report.

The accessibility compliance evaluation of a non-native hierarchy by an embodiment results in an accessibility compliance report pertaining to the non-native elements in that hierarchy. Similarly, the accessibility compliance evaluation of a native hierarchy by an embodiment results in an accessibility compliance report pertaining to the native elements in that hierarchy.

In one embodiment, the compliance report of different hierarchies are generated and presented as separate reports. Such separation of reports is helpful when different developer groups have to work on the compliance of native and non-native elements. In another embodiment, the compliance report of different hierarchies are generated and presented as a unified report. Such a unified report is helpful when a developer attempting to remedy a compliance of a non-native element has to understand the relationship between the non-native element and a native element in the infrastructure where the non-compliance occurs. For example, sometimes the non-compliance of a non-native element has be remedied by changing an attribute of a native element, and without a unified report, such remedies will be cumbersome, error-prone, or even unsatisfactory.

A method of an embodiment described herein, when implemented to execute on a data processing system, comprises substantial advancement of the functionality of that data processing system in making UIs accessibility compliant. For example, the illustrative embodiments enable the data processing system to dynamically determine environment-specific, user-specific, accessibility compliance of a UI relative a given native infrastructure. Such manner of accessibility compliance checking is unavailable in presently operating data processing systems that present UIs. Thus, a substantial advancement of such data processing systems by executing a method of an embodiment comprises checking a UI for accessibility compliance without being limited to static compliance testing, manufacturer or developer specified compliance checking, and partial compliance checking of only a piece of the entire environment that contributes to the presentation of the UI.

The illustrative embodiments are described with respect to certain accessibility features, UIs, non-native elements, native elements, relationships, attributes, native-infrastructure, hierarchies, profiles, reports, policies, logic, rules, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
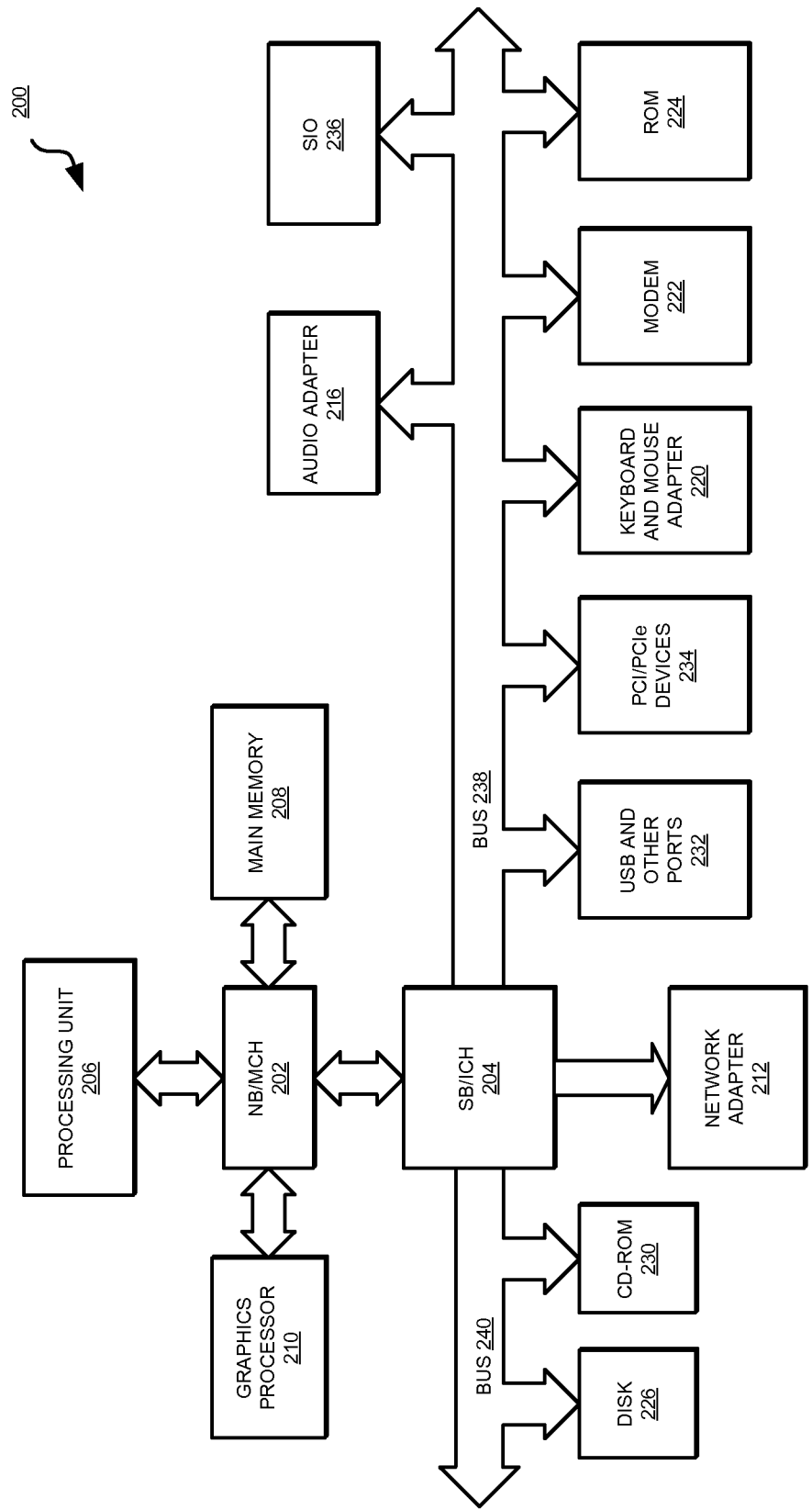
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments.

Device 132 is any suitable mobile computing platform, for example, a smartphone, tablet computer, a portable data processing device, an embedded device, an appliance, a device integrated into a vehicle or a system, or a wearable computing device. Device 132 includes application 133, which implements an embodiment for constructing one or more hierarchies of elements related to UI 134 presented using the native infrastructure of device 132 as described herein. Native widgets 135 are any number or type of components of the native infrastructure of device 132, which are responsible for creating, enforcing, applying, or otherwise managing native elements in the native infrastructure of device 132. Client 112 similarly includes application 113, which implements an embodiment for constructing one or more hierarchies of elements related to UI 111 presented using the native infrastructure of client 112 as described herein. Native widgets 115 are any number or type of components of the native infrastructure of client 112, which are responsible for creating, enforcing, applying, or otherwise managing native elements in the native infrastructure of client 112. Server 104 includes application 105, which includes an embodiment for performing the accessibility compliance evaluation of a UI, such as UI 111 or UI 134, where the UI's compliance is dependent upon one or more hierarchies as described herein. In one implementation, server 104 comprises one or more physical or virtual data processing systems in a cloud computing environment, and application 105 comprises a service, accessible to application 113 or 133 over network 102. In one embodiment, application 105 can execute in device 132, or client 112 locally.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments. Data processing system 200 is also representative of other devices in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105, user interface 111, application 113, native widgets 115, application 133, user interface 134, and native widgets 135 in FIG. 1, are located on storage devices, such as hard disk drive 226 or a solid-state data storage device, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a mobile device, which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
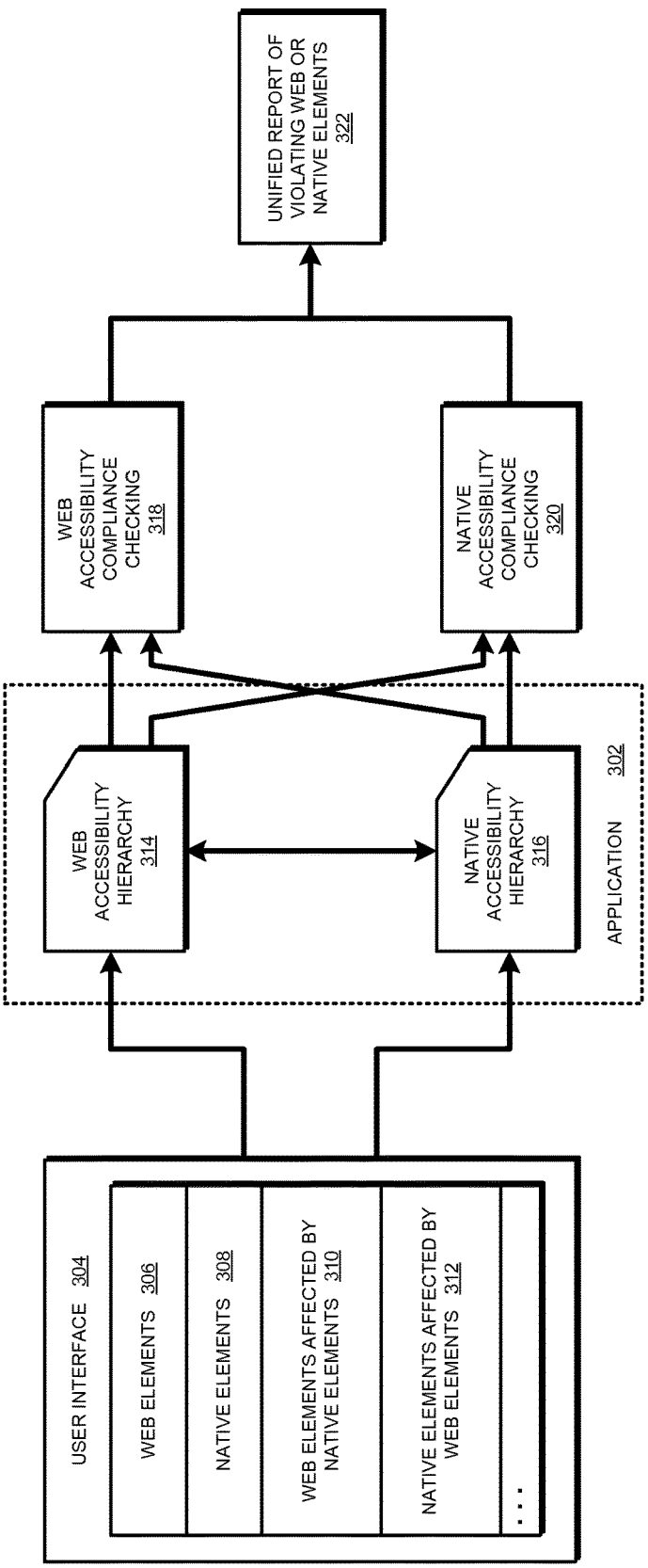
FIG. 3 depicts an example configuration for evaluating accessibility compliance of a hybrid user interface design in accordance with an illustrative embodiment.

With reference to FIG. 3, this figure depicts an example configuration for evaluating accessibility compliance of a hybrid user interface design in accordance with an illustrative embodiment. Application 302 is an example of application 113 or 133 in FIG. 1.

UI 304 is an example of UI 111 or 134 in FIG. 1. UI 304 when presented on a native infrastructure, such as that of device 132 or client 112 in FIG. 1, uses some combination of one or more web elements 306, and one or more native elements 308.

The accessibility of a web element, e.g., web element 310, can be affected by a native element. Consider, as an example of web element 310, a text field web element in an html page of UI 304. A color contrast attribute, a font attribute, a font size attribute, or some combination of one or more of these or other attributes may be set by the UI designer to specific values. Assume for example that the font size is set to 14 by the designer, and that font size meets a given accessibility specification. When UI 304 is presented on device 132, a native element in native elements 308 overrides the font size attribute and sets the font size of the text field to 6, which causes a compliance violation with the given accessibility specification.

The example scenario of a web element being affected by a native element is presented only to clarify the description of FIG. 3, and is not intended to imply a limitation on the illustrative embodiments. From this disclosure, those of ordinary skill in the art will be able to conceive many other scenarios in which a native element's influence over a non-native element can be found, and the same are contemplated within the scope of the illustrative embodiments.

Likewise, the accessibility of a native element, e.g., native element 312, can be affected by a native element. Consider, as an example of native element 312, a button native element in a native infrastructure, such as a graphical "Home" button on some iOS and Android devices. A size attribute, a color attribute, a spacing attribute, or some combination of one or more of these or other attributes may be set by the native infrastructure developer of device 132 to specific values.

Assume for example that the spacing between the Home button and any other adjacent graphical artifact on device 132's screen is set to 10 pixels by the developer, and that spacing meets a given accessibility specification. When UI 304 is presented on device 132, a web element in web elements 306 is so presented that the separation between that web element and the Home button is reduced to 6 pixels, which causes a compliance violation with the given accessibility specification.

The example scenario of a native element being affected by a web element is presented only to clarify the description of FIG. 3, and is not intended to imply a limitation on the illustrative embodiments. From this disclosure, those of ordinary skill in the art will be able to conceive many other scenarios in which a web element's influence over a native element can be found, and the same are contemplated within the scope of the illustrative embodiments.

Application 302 constructs web hierarchy 314 for accessibility analysis, native hierarchy 316 for accessibility analysis, and establishes the relationships between one or more elements of web hierarchy 314 and one or more elements of native hierarchy 316. Application 302 sends web hierarchy 314 and native hierarchy 316 for web accessibility compliance checking 318, such as to application 105 in server 104 in FIG. 1. Application 302 sends web hierarchy 314 and native hierarchy 316 native accessibility compliance checking 320 to application 105 or a different instance of application 105.

The compliance checking at one or more instances of application 105 produces report 322. According to one embodiment, report 322 is a unified report, which informs about any web elements as well as any native elements that are the reason for an accessibility violation.

Figure 4:
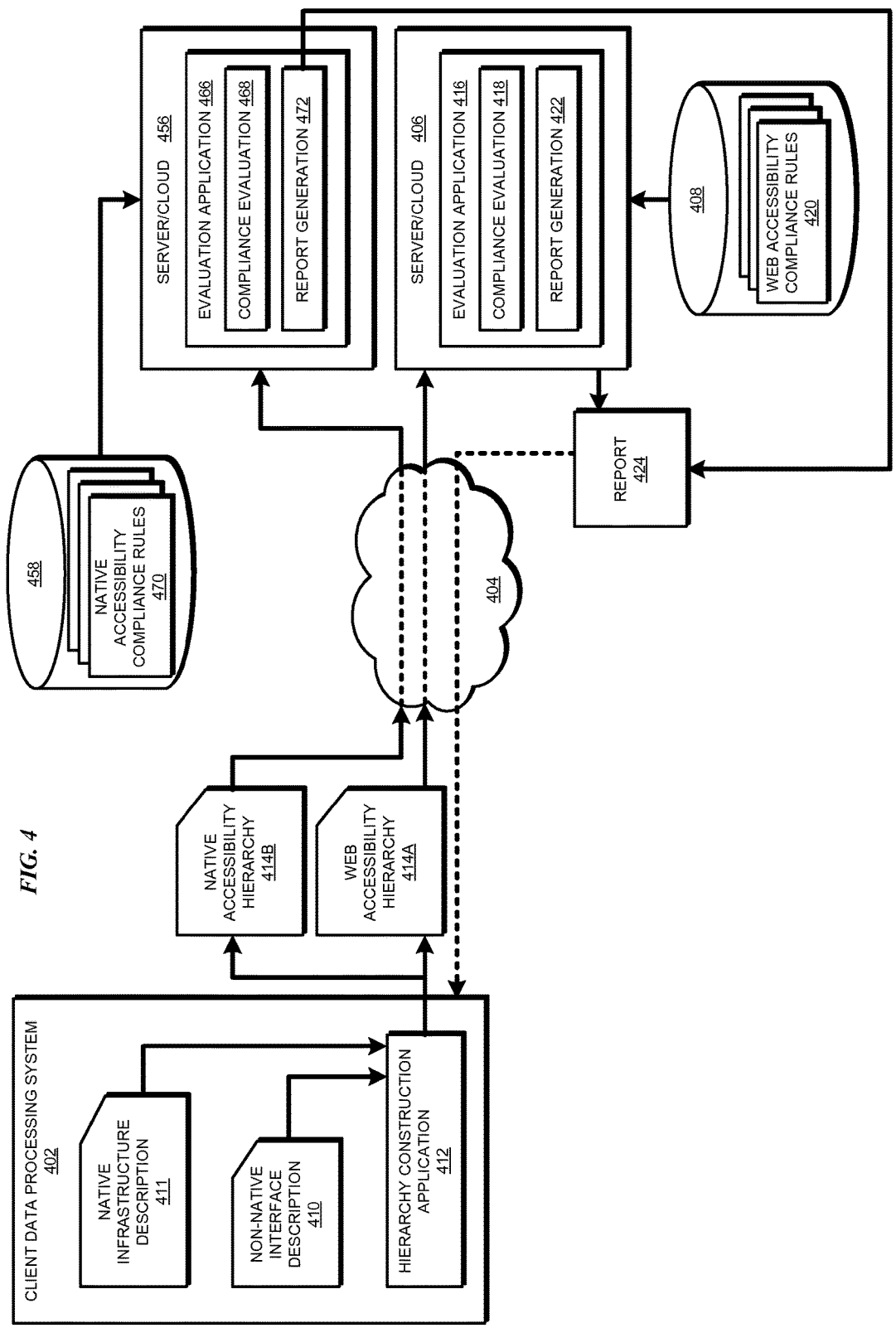
FIG. 4 depicts a block diagram of a configuration for evaluating accessibility compliance of a hybrid user interface design in accordance with an illustrative embodiment.

With reference to FIG. 4, this figure depicts a block diagram of a configuration for evaluating accessibility compliance of a hybrid user interface design in accordance with an illustrative embodiment. Client data processing system 402 (client) is an example of client 112 or device 132 in FIG. 1. Network 404 is an example of network 102 in FIG. 1. Data processing system 406 (server) can be a server data processing system, such as server 104 in FIG. 1, or a combination of one or more physical and virtual data processing systems in a cloud computing environment. Repository 408 can be implemented using storage 108 in FIG. 1.

In operation, client 402 presents a UI including one or more accessibility features. Non-native interface description 410 contains a description of the web elements of the UI, including one or more web elements implementing the one or more accessibility features. Native interface description 411 contains a description of the native elements used in the native infrastructure of client 402, including one or more native elements implementing the one or more accessibility features.

Hierarchy construction application 412 (client application) uses a model or document 410, for example, DOM or a web page, in the manner described elsewhere in this disclosure, to construct web hierarchy 414A. Hereinafter, such model, document, page, or other manifestation thereof is collectively referred to as non-native interface description. Client application 412 uses description 411, e.g., a suitable description of the native infrastructure in XML or other suitable form, in the manner described elsewhere in this disclosure, to construct native hierarchy 414B. Hereinafter, such description or any suitable manifestation thereof is collectively referred to as native infrastructure description.

Web hierarchy 414A organizes certain web elements used in or reachable from the UI, such that the organization can be evaluated for accessibility compliance in the manner of an embodiment. Native hierarchy 414B organizes certain native elements used in or influencing the presentation of the UI on client 402, such that the organization can be evaluated for accessibility compliance in the manner of an embodiment.

Client application 412 sends accessibility hierarchies 414A and 414B over network 404 to one or more data processing systems executing one or more instances of evaluation application 105 of FIG. 1. Only as an example, and without implying any limitation thereto, assume that different instances of the evaluation application are used in a given configuration to evaluate the accessibility compliance of different hierarchies.

For example, server 406 executes evaluation application 416. Evaluation application 416 receives web hierarchy 414A. Component 418 selects one or more rules from web accessibility compliance rules 420 in repository 408. Component 418 evaluates the accessibility attributes of the web elements in web hierarchy 414A for compliance with the accessibility parameters defined in a selected web accessibility compliance rule.

Component 422 produces accessibility compliance report 424. Depending on the particular implementation, report 424 may include compliance failure description of certain web elements of the UI, failure and compliance descriptions of certain web elements, a degree of severity of a compliance failure, a recommendation to remedy a compliance failure, or a combination thereof.

In one embodiment (not shown), evaluation application 416 in server 406 can also perform accessibility compliance checking of native hierarchy 414B using native accessibility compliance rules 470 in repository 458. Furthermore repository 458 and repository 408 may wholly or partially overlap (not shown).

In an embodiment, as shown, server 456 executes evaluation application 466. Evaluation application 466 receives web hierarchy 414B. Component 468 selects one or more rules from native accessibility compliance rules 470 in repository 458. Component 468 evaluates the accessibility attributes of the native elements in native hierarchy 414B for compliance with the accessibility parameters defined in a selected native accessibility compliance rule.

Component 472 contributes information about the accessibility compliance issues related to native elements to accessibility compliance report 424. Depending on the particular implementation, report 424 may include compliance failure description of certain native elements of the UI, failure and compliance descriptions of certain web elements, failure and compliance descriptions of certain native elements, failure and compliance descriptions of a web element because of a native element, failure and compliance descriptions of a native element because of a web element, a degree of severity of a compliance failure, or a combination thereof. Report 424 may also include a recommendation to remedy a compliance failure in a web element by manipulating the web element, a recommendation to remedy a compliance failure in a web element by manipulating the native element, a recommendation to remedy a compliance failure in a native element by manipulating the web element, a recommendation to remedy a compliance failure in a native element by manipulating the native element, or a combination thereof.

In one embodiment, client 402 receives report 424. Report 424 may be useful to, for example, a user who may be interacting with the UI or an application that may be presenting the UI. As another example, report 424 may be useful to an entity other than the user or the application, such as to a standards body, a manufacturer of the application, a developer of the native infrastructure of client 402, a public interest group, or a regulating entity.

Figure 5:
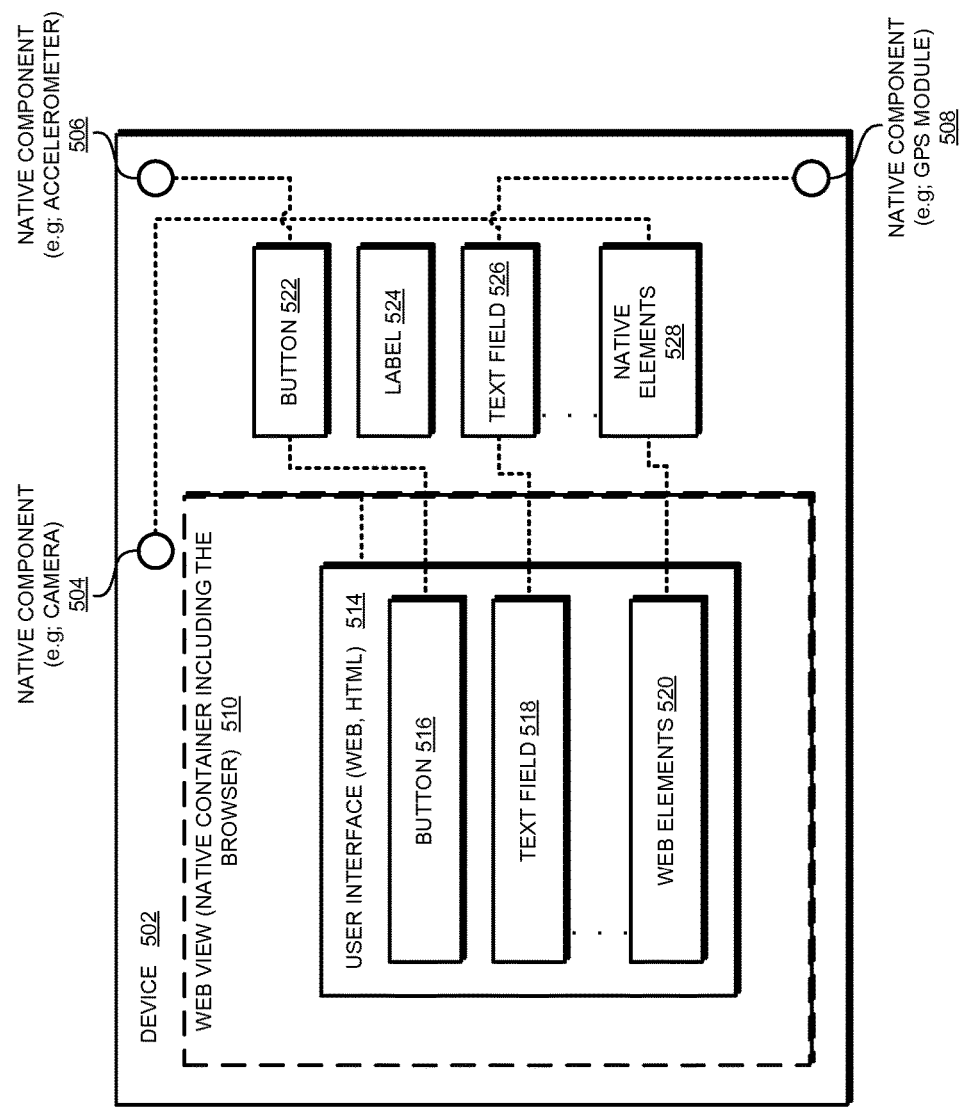
FIG. 5 depicts a block diagram of an example hybrid UI whose accessibility can be evaluated in accordance with an illustrative embodiment.

With reference to FIG. 5, this figure depicts a block diagram of an example hybrid UI whose accessibility can be evaluated in accordance with an illustrative embodiment. Device 502 is an example of device 132 or client 112 in FIG. 1. The relationships between a device, the device's components in the device's native infrastructure, non-native elements of a UI, and native elements of the device's native infrastructure are explained in this figure by way of non-limiting examples of such artifacts.

The native infrastructure of device 502 includes any number or types of device components (native components), such as native components 504, 506, and 508. For example, native component 404 may be a camera, native component 506 may be an accelerometer, and native component 508 may be a Global Positioning System (GPS) module.

Native element 510 is an example webView container native element, which implements the browser used for presenting UI 514. Certain attributes of webView container 510 govern how UI 514 is presented in webView 510 in device 502.

Only as an example, assume that UI 514 is a web interface implemented in html and includes any number or type of web elements, such as button 516, text field 518, and other web elements 520.

In many cases, a native component of a device is accessible to a UI via a native element. For example, if a web element of a UI needed to access the camera on a device, the web element has to refer to or use a native component in the device's native infrastructure to use such a native component. Access to GPS components, accelerometer of the device, audio/video controls, plug-in peripherals, kernel services, log data, and many other native components is controlled or marshaled through native elements in this manner.

For example, web element 'button' 516 may have to grayed out when the device is moving, but data of accelerometer 506 to determine whether the device is moving is available through example native element 'button' 522. Many native elements may be available in the native infrastructure of device 502 for a similar purpose or other reasons. 'Label' 524 is another example native element, as is text field 526.

Any number or type of native elements may be similarly available in the native infrastructure of device 502. For example, web element 'text field' 518 may use the GPS information of native component 508 by looking-up or otherwise using native element 'text field' 526. A web element in web elements 520 may access camera component 504 by calling, referring to, or otherwise using a native component in native elements 528. Such use by or reliance upon a native element by a web element affects the accessibility compliance of the web element, the native element, or both.

Figure 6:
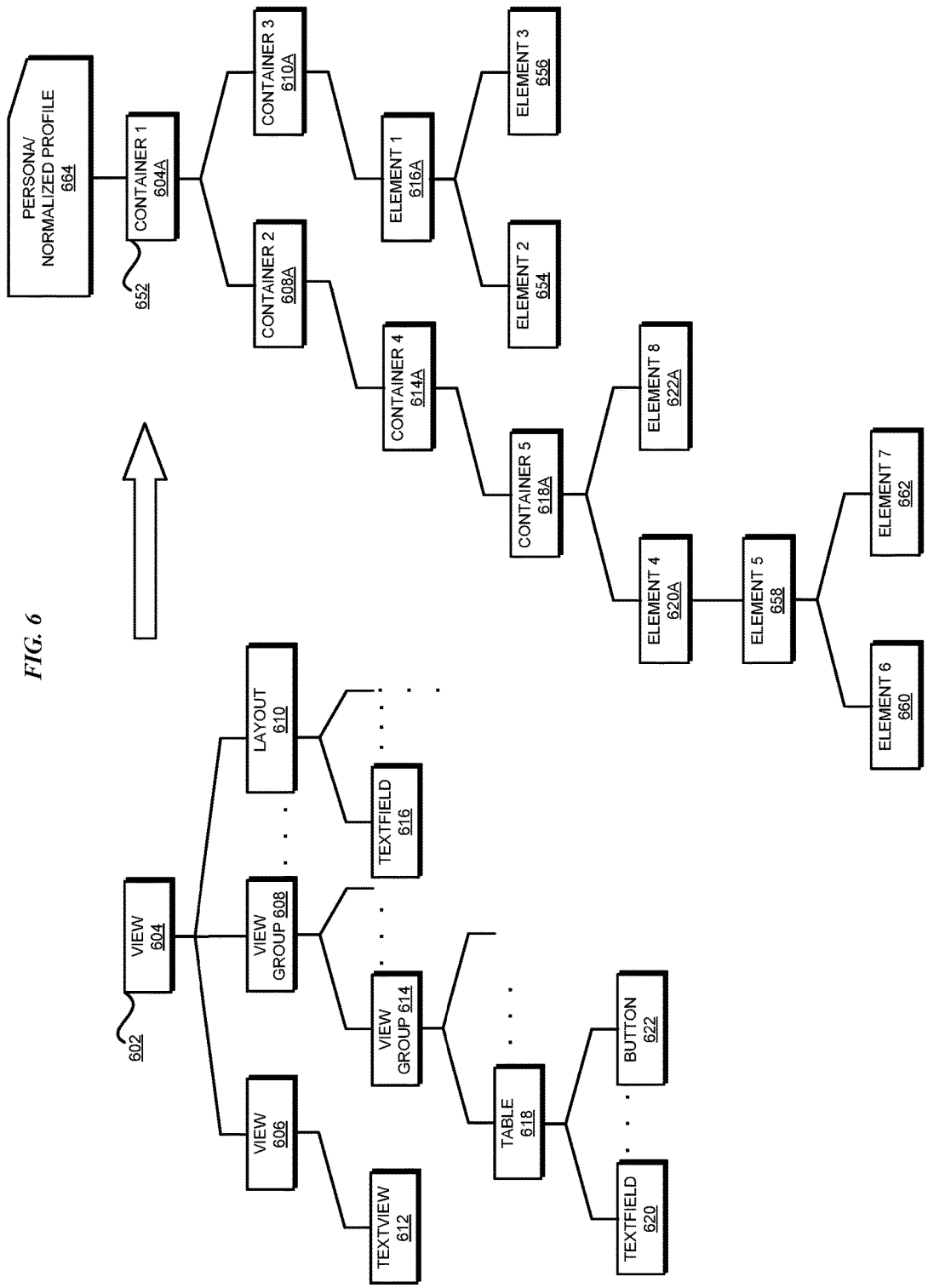
FIG. 6 depicts a process of generating a hierarchy of elements for evaluating accessibility compliance of a UI design in accordance with an illustrative embodiment.

With reference to FIG. 6, this figure depicts a process of generating a hierarchy of elements for evaluating accessibility compliance of a UI design in accordance with an illustrative embodiment. Hierarchy 602 is an example organization of example UI elements, such as interface description 410 or native infrastructure description 411 in FIG. 4. Hierarchy 652 is an example of web hierarchy 414A or native hierarchy 414B (collectively, "accessibility hierarchy") generated by hierarchy construction application 412 in FIG. 4, corresponding to interface description 410 or native infrastructure description 411, respectively. The description of this figure describes the operations of an embodiment with respect to web elements in a web hierarchy of a UI only as examples and not to imply any limitations. The embodiment is adaptable to produce a native hierarchy by operating the embodiment by using native elements from a corresponding native infrastructure definition in a similar manner.

Only as an example, and without implying any limitation thereto, assume that the UI is an interface from an iOS application using iOS platform. Interface hierarchy 602 begins at node "view" 604. Node 604 is a container element node because node 604 is a parent node to one or more other nodes, such as example nodes 606, 608, and 610. Assume that node 606 is a view type container element, and includes leaf node 612, which is some textual visual content. Leaf node 612 is an individual element because leaf node 612 is not a parent to any other node in interface hierarchy 602. Only as an example to illustrate the operation of an embodiment, assume that individual element 612 comprises static textual content.

Similarly, node 608 is a container node of type "view group" and includes another "view group" type container element 614. Node 610 is a layout type container element, and among other things, includes text-field type individual element 616 for content. Again, only as an example to illustrate the operation of an embodiment, assume that individual element 612 comprises audio or video content.

Container element 614 includes another container element 618, which is a table type container element. Table 618 includes, among other things, individual nodes 620 and 622. Only as an example to illustrate the operation of an embodiment, assume that individual element 620 is a text-field type element and comprises active or dynamically-generated content. Individual element 622 is a button type control element on the UI, which allows some action to be performed on the active content of individual element 620. Active or dynamically generated content, as in individual node 620, is an element of a UI whose exact nature or type is not specified or described in the interface description or interface hierarchy 602, but it resolved or populated on the UI at run-time. As an example, assume that dynamically generated content 620 under certain circumstances would result in a uniform resource locator (URL), a link, to some content that calls, launches, or presents additional controls. Some examples of such content are audio or video data, reference to launch another application (which may present another UI), and data to transition to another UI within the application.

An application implementing an embodiment, such as hierarchy construction application 412 in FIG. 4, roots accessibility hierarchy 652 at container element 604A, which corresponds to node 604 in interface hierarchy 602. If any view-level accessibility attributes are defined or available for node 604, the application selects and adds those attributes to node 604A.

Given the example static content of node 612 as described above, in an example operation, the application determines that nodes 606 and 612 are not candidates for accessibility features. Accordingly, the application omits including nodes corresponding to nodes 606 and 612 in accessibility hierarchy 652.

The application similarly adds nodes 608A, 612A, 614A, 616A, 618A, 620A, and 622A to accessibility hierarchy 652. Nodes 608A, 614A, 616A, 618A, 620A, and 622A correspond to nodes 608, 614, 616, 618, 620, and 622, respectively, in interface hierarchy 602. Where available or determinable, the application adds the accessibility attributes to a node in accessibility hierarchy 652. For example, node 622 may not include any accessibility attributes in interface hierarchy 602; however, nodes 614 and 618—both of which are parent nodes to node 622, may define same or distinct accessibility attributes. Accordingly, the application determines that node 622 inherits at least a subset of the accessibility attributes from one or both parent nodes. The application therefore adds such a subset of accessibility attributes to node 622A in accessibility hierarchy 652.

Note that in one embodiment, adding the subset of accessibility attributes to node 622A can be avoided if the parent-child relationship of node 622A with other nodes in accessibility hierarchy 652 remains the same as the parent-child relationships of corresponding node 622 in interface hierarchy 602, and that subset of accessibility attributes remains available at node 622A through such relationships in accessibility hierarchy 652. In another embodiment, adding the subset of accessibility attributes to node 622A is needed if the parent-child relationship of node 622A with other nodes in accessibility hierarchy 652 is different from the parent-child relationships of corresponding node 622 in interface hierarchy 602, owing to any reorganization, omission, addition, or replication operations performed by the application in accessibility hierarchy 652. Due to such operations, the subset of accessibility attributes available at node 622 would not available through the relationships of node 622A in accessibility hierarchy 652, and has to be expressly added to node 622A to correctly communicate the accessibility features of node 622 on the UI.

Given the example audio or video content of node 616 as described above, in an example operation, the application determines that node 616 will call or present additional controls or elements that should be evaluated for accessibility even though such controls or elements are not described in interface hierarchy 602. Accordingly, using a suitable process, determines another UI that will be launched or presented for interacting with the audio or video content of node 616. The application identifies the controls or elements such other UI does include or would include. The application includes nodes corresponding to such controls or elements as nodes 654 and 656 in accessibility hierarchy 652.

Without implying any limitation thereto, one example process for identifying the other UI can include examining configuration information for the application that presents the UI of interface hierarchy 602. Such examining reveals the identity, location, and configuration of the plugin that would be launched to interact with audio or video content. Any suitable method, e.g., an application program interface (API) call, can then be used to determine the UI the plugin presents, and the controls or elements situated thereon.

An embodiment can then operate on such other UI and the controls or elements to determine their accessibility attributes. Once determines, nodes 654 and 656 can be constructed for such controls or elements, and their accessibility attributes can be used to populate the accessibility attributes of nodes 654 and 656.

Given the example active or dynamically generated content of node 620 as described above, in an example operation, the application determines that node 620 will call or present additional controls or elements that should be evaluated for accessibility even though such controls or elements are not described in interface hierarchy 602. Accordingly, using a suitable process, additional elements that will be presented for interacting with the active content of node 620.

The application identifies the controls or elements, which may themselves be in some hierarchy. Accordingly, the application includes nodes corresponding to such organization of controls or elements as nodes 658, 660, and 662, along with their determined accessibility attributes, in accessibility hierarchy 652.

In some implementations, an application that presents the UI corresponding to interface hierarchy 602 may allow identifying the application exactly or by a class or category of the application. Under certain circumstances, a user of the UI may similarly allow identifying the user exactly or by a class or category of the user. Thus, an embodiment associates one or more profiles, normalized profiles, or a combination thereof, 664, with accessibility hierarchy 652. A normalized profile can describe a class of applications that present similar UIs or accessibility features. A normalized profile can also describe a persona, e.g., a characteristic or feature common to a class of users.

The example process of defining nodes 654-662 is not intended to be limiting on the illustrative embodiments. From this disclosure, those of ordinary skill in the art will be able to conceive other ways of identifying UI elements not specified in interface hierarchy 602, identifying their accessibility attributes, and including them in accessibility hierarchy 652. Such other ways are implementation dependent and therefore not conducive to exhaustive listing or description herein, but are contemplated within the scope of the illustrative embodiments.

As stated earlier, the embodiment is adaptable to produce a native hierarchy by operating the embodiment by using native elements from a corresponding native infrastructure definition in a similar manner. Furthermore, when a web element in hierarchy 652 is influenced or affected by a native element, such relationship is also notated in the corresponding web element in hierarchy 652. The influencing or affecting native element of a native hierarchy similar to hierarchy 652 is reachable from such a notated web element in hierarchy 652.

Conversely, when hierarchy 652 is a native hierarchy, and a native element in hierarchy 652 is influenced or affected by a web element, such relationship is similarly notated in the corresponding native element in hierarchy 652. The influencing or affecting web element of a web hierarchy is reachable from such a notated native element in hierarchy 652.

In one embodiment, the notation includes a copy of the influencing or affecting element within the influenced or affected element. In another embodiment, the notation comprises a reference within the influenced or affected element to the influencing or affecting element. In another embodiment, the notation comprises an attribute of the influencing or affecting element within the influenced or affected element. In another embodiment, the notation comprises a reference within the influenced or affected element to an attribute of the influencing or affecting element.

Figure 7B:
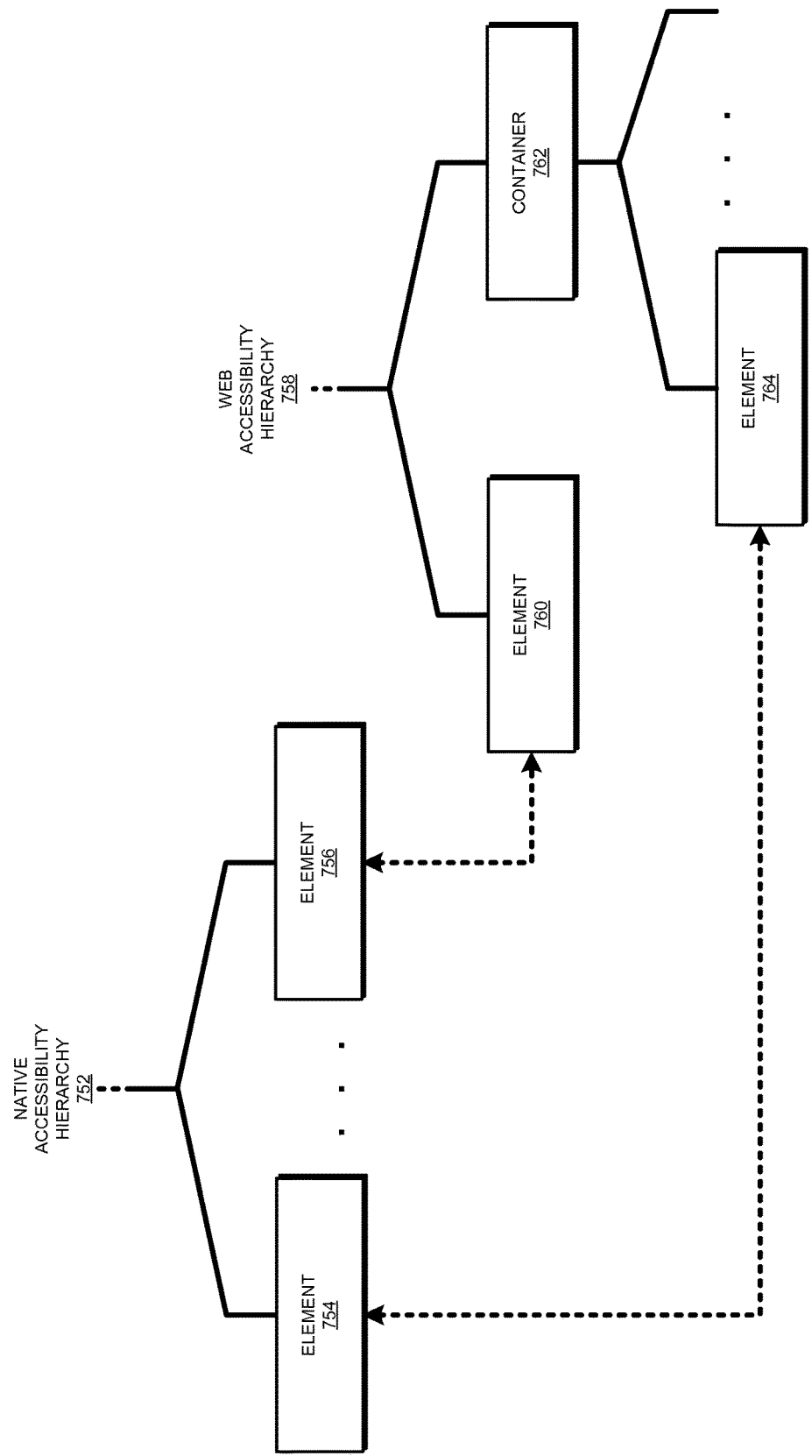
FIG. 7B depicts a block diagram of another example way of representing elements of a hybrid UI in accordance with an illustrative embodiment.

More than one influencer elements in one hierarchy 652 may influence an element in another hierarchy 652. Accordingly, more than one inclusions, references, or a combination thereof, are possible in an element of hierarchy 652 within the scope of the illustrative embodiments. FIGS. 7A and 7B depict some examples of such inclusions and references.

With reference to FIG. 7A, this figure depicts a block diagram of an example way of representing elements of a hybrid UI in accordance with an illustrative embodiment. Native hierarchy 702 is an example of hierarchy 652 of FIG. 6, when hierarchy 652 represents an organization of native elements used in presenting a UI. Elements 704 and 706 are example elements in hierarchy 702.

As an example, element 704 is a container element node and element 706 is a leaf node in hierarchy 702. Furthermore, container element 704 is an example webView container as described earlier, such as webView container 510 in FIG. 5.

Web hierarchy 708 is another instance of hierarchy 652 in FIG. 6, and represents the web elements of the UI presented in webView container. Assume that in this non-limiting example depiction, the entirety of web hierarchy 708 is dependent upon webView container 704. Accordingly, web hierarchy 708 is represented in this figure as being referenceable or reachable from webView container element 704.

With reference to FIG. 7B, this figure depicts a block diagram of another example way of representing elements of a hybrid UI in accordance with an illustrative embodiment. Native hierarchy 702 is an example of hierarchy 652 of FIG. 6, when hierarchy 652 represents an organization of native elements used in presenting a UI. Elements 754 and 756 are example elements in hierarchy 752.

Web hierarchy 758 is another instance of hierarchy 652 in FIG. 6, and represents the web elements of a UI presented using the native elements of native hierarchy 752. Assume that in this non-limiting example depiction, accessibility attributes of web element 760 can be modified by native element 756. Accordingly, native element 756 is referenced and reachable from web element 760 during accessibility compliance analysis. Assume as another example, that native element 754 is influenced by web element 764, which is a part of web container element 762. Accordingly, native element 754 references web element 764, and web element 764 is reachable from native element 754 during accessibility compliance analysis.

Figure 8:
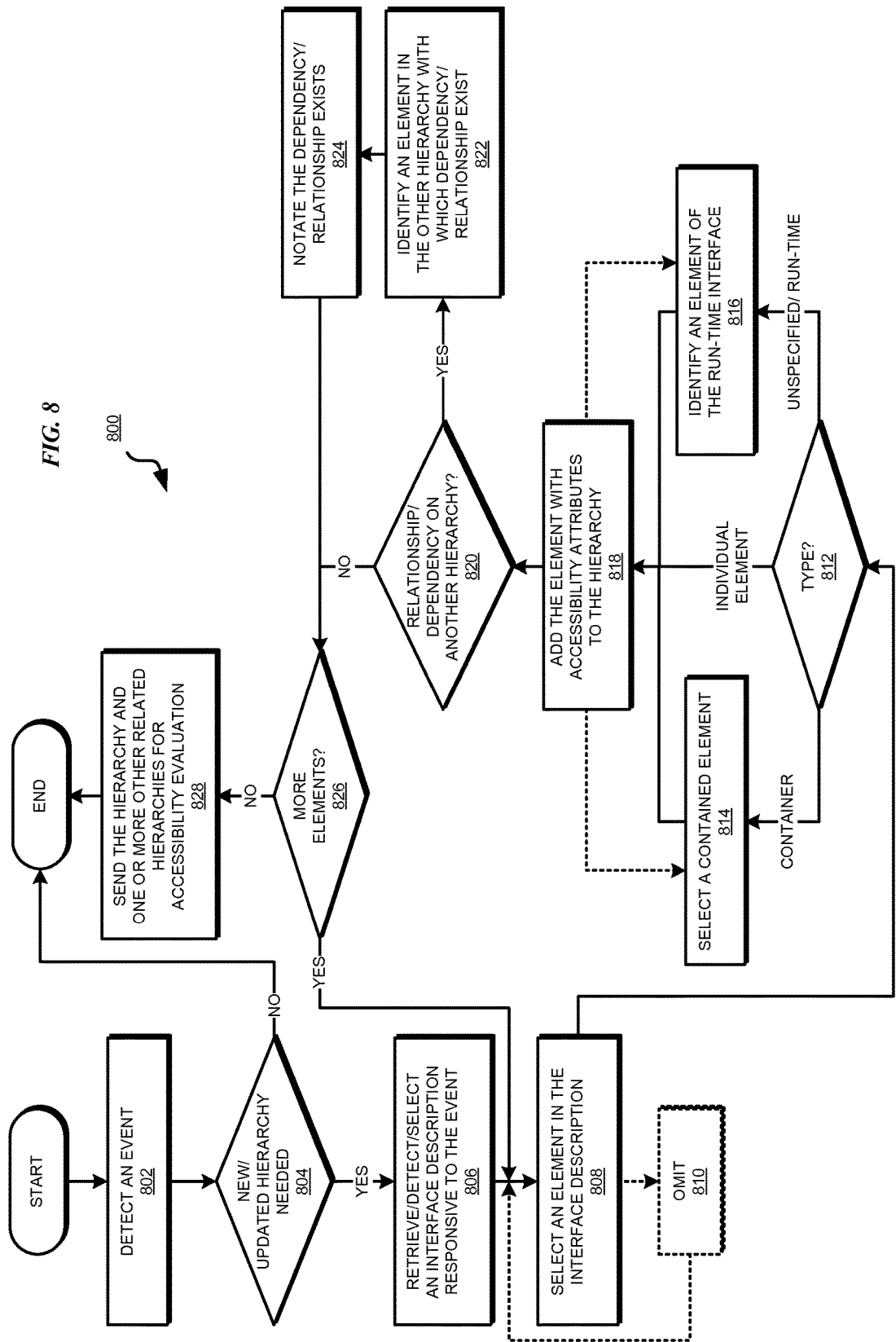
FIG. 8 depicts a flowchart of an example process for constructing an accessibility hierarchy in accordance with an illustrative embodiment.

With reference to FIG. 8, this figure depicts a flowchart of an example process for constructing an accessibility hierarchy in accordance with an illustrative embodiment. Process 800 can be implemented in hierarchy construction application 412 in FIG. 4. Process 800 produces an accessibility hierarchy, such as example accessibility hierarchy 652 in FIG. 6, for accessibility compliance evaluation. As with several other embodiments described herein, process 800 is described using web elements and a web hierarchy only as an example and not as a limitation. Process 800 can similarly be adapted based on this disclosure to produce native hierarchies of native elements within the scope of the illustrative embodiments.

The application detects an event or a change at a client data processing system (block 802). The application determines whether a new or updated accessibility hierarchy is needed responsive to the event (block 804). For example, the application determines whether the UI that is presented in response to the event has been changed, and the change has not yet been mapped to an accessibility hierarchy, or has changed since it was last mapped an accessibility hierarchy. If a new or updated accessibility hierarchy is not needed ("No" path of block 804), the application ends process 800 thereafter, or returns to block 802 (not shown) and awaits detecting another event.

If a new or updated accessibility hierarchy is needed ("Yes" path of block 804), the application retrieves, detects, or otherwise selects an interface description for the UI that is responsive to the event (block 806). The application selects an element in the interface description (block 808). Optionally, depending on the nature of the selected element, the application may omit including the element into the accessibility hierarchy being constructed (block 810). Omitting element 612 of FIG. 6 is an example omission according to block 810. Upon omitting an element, the application returns process 800 to select another element at block 808.

When not omitted, the application determines a type of the selected element (block 812). If the element is an individual element ("Individual" path of block 812), for example, element 622 of FIG. 6, the application proceeds to block 818. If the element is a container element ("Container" path of block 812), for example, element 618 of FIG. 6, the application selects a contained element, to wit, a leaf node or an individual element, or another container element in the selected element (block 814). The application proceeds to block 818 thereafter. If the element indicates further unspecified elements, or an element that is resolved at run-time ("Unspecified/run-time" path of block 812), for example, element 616 of FIG. 6, the application identifies an element of the interface presented at run-time (block 816). The application proceeds to block 818 thereafter.

The application adds the individual element, the container and contained elements, or the element from the run-time interface, as the case may be, along with the corresponding set of stated, derived, or computed accessibility attributes, to the accessibility hierarchy (block 818). Depending on the nature of the container element or the run-time interface, the application may return to blocks 814 or 816, respectively, until all elements in the container or the run-time interface have been added (or omitted) at block 818. The application may also resolve and calculate new values for the affected attribute.

The application determines whether the element of block 818 has a relationship with or dependency on an element in another hierarchy (block 820). If no such relationship or dependency exists ("No" path of block 820), the application proceeds to block 826. If a relationship or dependency exists ("Yes" path of block 820), the application identifies an element in the other hierarchy with which the relationship or dependency exists (block 822). The application notates the dependency or relationship in or relative to the element of block 818.

The application determines whether more elements remain in the interface description (block 826). If more elements remain in the interface description ("Yes" path of block 826), the application returns to block 808 and selects another element. If no more elements remain in the interface description ("No" path of block 826), the application sends the accessibility hierarchy thus constructed, and all or part of one or more other related hierarchies according to the operations of blocks 820, 822, and 824, for accessibility evaluation, such as to process 900 of FIG. 9, (block 828). The application ends process 800 thereafter.

In one embodiment, the application associates (not shown) one or more profiles or normalized profiles with the accessibility hierarchy before sending in block 828. The selection and association of profiles or normalized profiles can be performed in any suitable manner within the scope of the illustrative embodiments.

Figure 9:
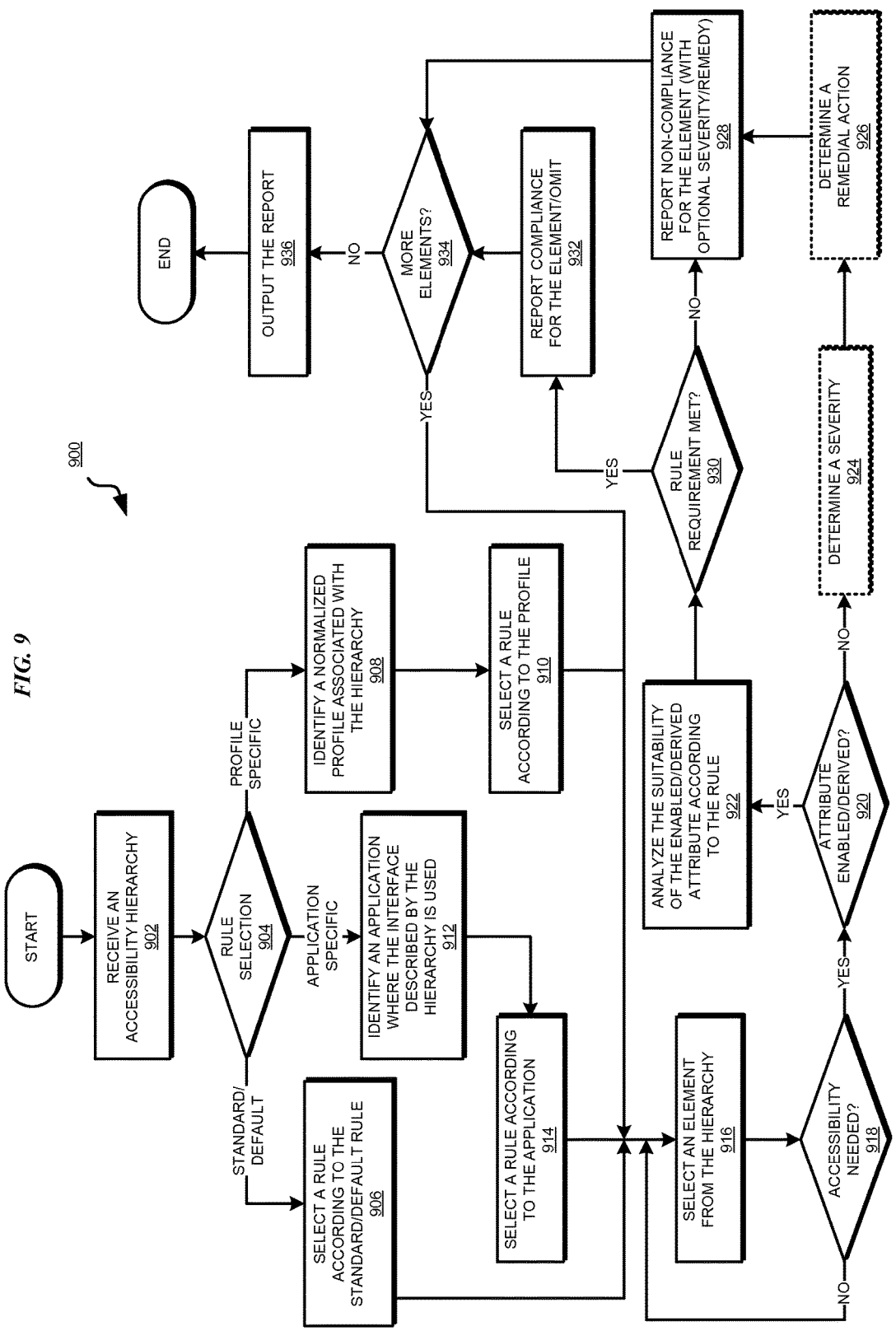
FIG. 9 depicts a flowchart of an example process for evaluating accessibility compliance of a hybrid UI design in accordance with an illustrative embodiment.

With reference to FIG. 9, this figure depicts a flowchart of an example process for evaluating accessibility compliance of a hybrid UI design in accordance with an illustrative embodiment. Process 900 can be implemented in evaluation application 416 and/or 456 of FIG. 4, to generate report 424 of FIG. 4.

The application, such as evaluation application 416 of FIG. 4, receives an accessibility hierarchy (block 602). For example, the accessibility hierarchy received in block 602 can be the accessibility hierarchy sent at block 522 in process 500 of FIG. 5. As with several other embodiments described herein, process 900 is described using web elements and a web hierarchy only as an example and not as a limitation. Process 900 can similarly be adapted based on this disclosure to produce native hierarchies of native elements within the scope of the illustrative embodiments.

The application determines a manner of selecting an accessibility compliance rule, such as from rules 420 in repository 408 of FIG. 4 (block 904). The selected rule can be any number and type of rules, e.g., a rule specific to a device, an application, an enterprise, a geography, a special case, a time, a purpose, an entity, a requirement, a usability, or a condition. When a standards-based rule or a default rule is to be selected ("standard/default" path of block 904), the application selects a rule according to the pertinent standard or default setting (block 906).

The application may determine to select one rule for the entire hierarchy, or apply multiple rules to the same hierarchy either one by one, or different rules for different nodes in the same hierarchy, depending on the particular needs of a given implementation.

When a user-specific rule is to be selected ("profile-specific" path of block 904), the application identifies the user or a category of the user according to a profile or a normalized profile of the user or user's category, respectively, associated with the hierarchy received in block 902 (block 908). The application selects a rule according to the identified user or user category (block 910).

When an application-specific rule is to be selected ("application-specific" path of block 904), the application identifies the application or a category of the application according to an application profile or a normalized profile of an application category, respectively, associated with the hierarchy received in block 902 (block 912). The application selects a rule according to the identified application or application category (block 914).

The application selects an element from the hierarchy (block 916). In one embodiment, additional or different rules may be applicable to the element selected in block 916. Accordingly, the embodiment selects such additional or different rules (not shown) as a part of block 916.

The application determines whether, according to the selected rule, including any additional or different element-specific rules, the selected element should be evaluated for accessibility (block 918). For example, even though an element of a UI may include an accessibility attribute, a selected rule may not require accessibility for that type of elements, or may not require compliance evaluation for such offered accessibility.

If the selected element should not be evaluated for accessibility ("No" path of block 918), the application returns to block 916 and selects another element. If the selected element should be evaluated for accessibility ("Yes" path of block 918), the application determines whether one or more accessibility attributes have been enabled for the element, associated with the element, or derivable for the element from a parent of the element (block 920). If so ("Yes" path of block 920), the application analyzes the suitability of such accessibility attribute according to the selected rule (block 922).

If not ("No" path of block 920), the application optionally determines a degree of severity of the compliance failure for not associating an accessibility attribute with the element (block 924). The application further, optionally, determines a remedial action to correct the compliance failure (block 926). The remedial action may be specified in the rule, may be determinable from the rule, may be specified for use in conjunction with the rule, or otherwise identifiable based on the rule. The application reports the non-compliance of the element, with optional degree of severity and/or remedial actions (block 928).

From block 922, the application determines whether the analysis of block 922 indicates that the element has met the accessibility requirements of the selected rule (block 930). The rule requirement check of block 930 incorporates any element-specific additional or different rules when such additional or different rules are selected in block 916 (not shown). If not ("No" path of block 930), the application performs the operation of block 928. If the accessibility of the selected element meets the accessibility requirement of the rule ("Yes" path of block 930), the application optionally reports the in-compliance status of the element (block 932).

The application determines whether more elements are to be similarly analyzed from the accessibility hierarchy of block 902 (block 934). If so ("Yes" path of block 934), the application returns process 900 to block 916 to select another element. In one embodiment, additional or different rules may be applicable to the element selected in block 916. Accordingly, the embodiment selects such additional or different rules (not shown) as a part of block 916. The rule requirement check of block 930 incorporates such additional or different rules in such an embodiment. Note that there can be rules that are applicable to both types of elements—the non-native elements as well as the native elements. The application may select the same rule for different elements, including different types of elements, under certain circumstances within the scope of the illustrative embodiments.

If not ("No" path of block 934), the application outputs the accessibility compliance report, e.g., report 424 in FIG. 4 (block 936). The application ends process 900 thereafter.

Figure 10:
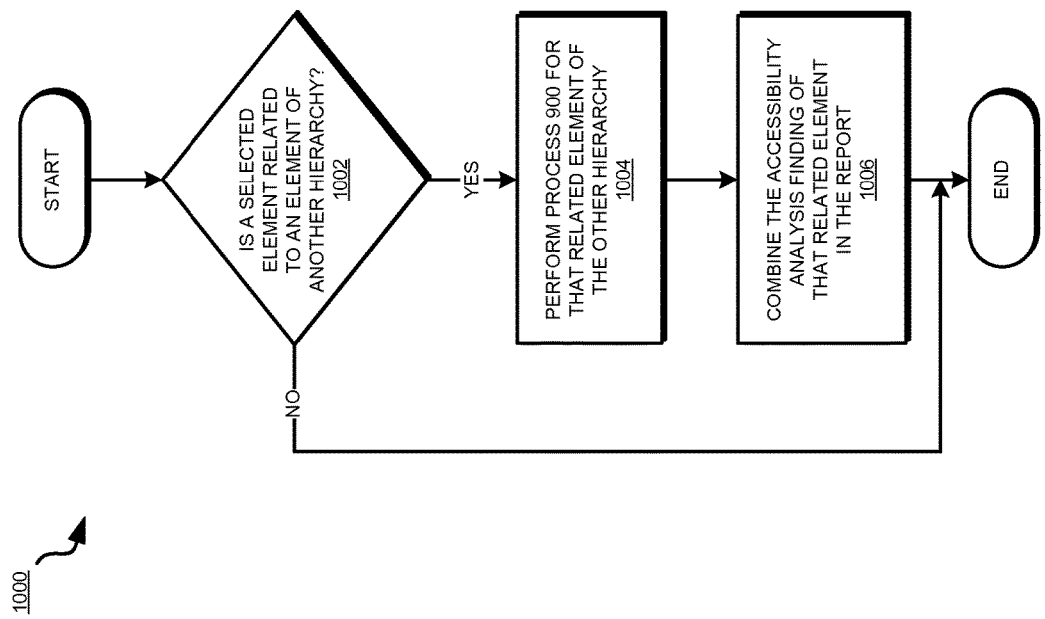
FIG. 10 depicts an example process for unifying or creating a unified accessibility compliance report in accordance with an illustrative embodiment.

With reference to FIG. 10, this figure depicts an example process for unifying or creating a unified accessibility compliance report in accordance with an illustrative embodiment. Process 1000 can be implemented in evaluation application 416 and/or 456 of FIG. 4, to generate report 424 of FIG. 4.

The application determines if a selected element is related to an element of another hierarchy (block 1002). Such a determination can be made, for example, using the notations made in the selected element by process 800 of FIG. 8. If no relationship exists ("No" path of block 1002), the application ends process 1000 for that selected element thereafter. If a relationship exists ("Yes" path of block 1002), the application performs process 900 or a part thereof as depicted in FIG. 9, on the related element of the other hierarchy (block 1004).

The application combines the accessibility analysis findings of that related element in the report being prepared in block 928 of process 900 for the selected element (block 1006). The application ends process 1000 thereafter.

Figure 11:
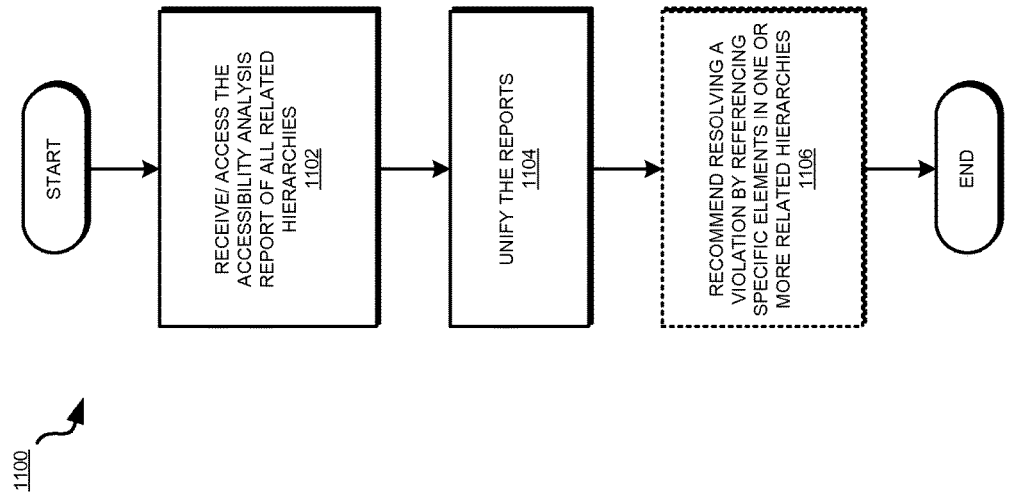
FIG. 11 depicts another example process for unifying or creating a unified accessibility compliance report in accordance with an illustrative embodiment.

With reference to FIG. 11, this figure depicts another example process for unifying or creating a unified accessibility compliance report in accordance with an illustrative embodiment. Process 1100 can be implemented in evaluation application 416 and/or 456 of FIG. 4, to generate report 424 of FIG. 4.

The application receives or accesses the accessibility analysis reports of all related hierarchies for a given UI (block 1102). The application combines or unifies the reports, such as by arranging related elements from different hierarchies together relative to an identified accessibility compliance failure in the report (block 1104). Optionally, the application recommends resolving a violation by referencing the specific elements in one or more related hierarchies (block 1106). The application ends process 1100 thereafter.

Thus, a computer implemented method, system or apparatus, and computer program product are provided in the illustrative embodiments for evaluating accessibility compliance of a hybrid user interface design. While the embodiments and examples are described with respect to checking accessibility compliance of a UI, the illustrative embodiments are similarly usable for other use-cases as well, and the same are contemplated within the scope of the illustrative embodiments. For example, using this disclosure, an embodiment can be configured to check compliance of a hybrid UI with usability rules, user-friendliness specifications, security rules, regulatory compliance rules, and other types of rules within the scope of the illustrative embodiments.

Furthermore, the embodiments are described with respect to iOS, iOS elements, browsers, html, and web elements only as examples. Other environments can also act as, or participate in, a native infrastructure. For example, the UI may include Adobe Flash content presented within Adobe Flash player, where the native elements may be a part of the player, and non-native elements may be contributed by the Flash content. (Adobe and all Adobe related marks are trademarks of Adobe Systems Incorporated, in the United States and in other countries.)

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for evaluating compliance of a hybrid user interface design, the method comprising:
   receiving, from a first application executing in a client data processing system, a first hierarchy of a first type of elements of a user interface, wherein a second application presents the user interface including a set of the first type of elements and a set of a second type of elements at the client data processing system, wherein the user interface is described in an interface description, wherein the interface description comprises an organization of a set of non-native elements according to a manner of presenting the set of the non-native elements on the user interface, wherein the first hierarchy is distinct from the organization for excluding a first subset of the set of non-native elements, and wherein the non-native elements in the subset are irrelevant to an accessibility feature, the accessibility feature being governed by a compliance rule;
   receiving, from the first application, a second hierarchy of the second type of elements used in a system-specific presentation of the user interface at the client data processing system;
   determining that a first element of the first type in the first hierarchy violates a condition specified in the compliance rule;
   determining that a second element of the second type in the second hierarchy is related to the first element;
   evaluating that an attribute of the second element causes an attribute of the first element to violate the condition, wherein the attribute of the first element complies with the condition when unaffected by the attribute of the second element; and
   reporting, responsive to the evaluating, the second element as a cause of the first element violating the condition.

2. The method of claim 1, further comprising:
   constructing the first hierarchy at the first application, wherein an element of the first type comprises a non-native element of the user interface, the non-native element being a member of the set of the non-native elements, the set of the elements of the first type forming the set of non-native elements and the first element forming a first non-native element, wherein the set of non-native elements has been coded into the user interface regardless of the system-specific presentation, the constructing comprises:
   detecting an event at the client data processing system;
   identifying the user interface as being responsive to the event;
   selecting the first non-native element from the interface description;
   identifying a first attribute of the first non-native element; and
   adding the first non-native element and the first attribute to the first hierarchy responsive to determining that the first attribute is usable in an accessibility compliance testing, the accessibility compliance testing being configured to test the accessibility feature according to the compliance rule.

3. The method of claim 2, wherein the adding adds the first non-native element in a first location relative to a first root node of the first hierarchy, wherein the first location is distinct from a second location of the first non-native element in the organization relative to a root of the organization.

4. The method of claim 2, wherein the organization omits a subset of the set of non-native elements, and wherein an omitted non-native element in the subset is resolved and reached from the user interface after the user interface has been presented at the client data processing system.

5. The method of claim 1, further comprising:
   determining that the second element does not violate a second compliance rule corresponding to the second type of elements, wherein the reporting the second element occurs regardless of the second element not violating the second compliance rule.

6. The method of claim 1, wherein an element of the second type comprises a native element of the client data processing system, the set of the elements of the second type forming the set of native elements and the second element forming a second native element, wherein the set of the native elements has been coded to manipulate the user interface to cause the system-specific presentation of the user interface at the client data processing system, and wherein the first hierarchy is distinct from the organization for further including a new non-native element that is absent in the set of non-native elements in the interface description, wherein the new non-native element is resolved at run-time.

7. The method of claim 6, further comprising:
   constructing the second hierarchy at the first application, the constructing comprises:
   determining that the attribute of the second native modifies an attribute of the first non-native attribute during the system-specific presentation of the user interface; and
   making the second native element of the second hierarchy reachable from the first non-native element of the first hierarchy during an accessibility compliance evaluation.

8. The method of claim 1, further comprising:
   selecting the first element responsive to determining that an attribute of the first element is an accessibility attribute configured to make the first element accessible to a user suffering from an impairment in using the user interface element.

9. The method of claim 1, further comprising:
   selecting the first element responsive to determining that an attribute of the first element is a usability attribute configured to measure a usability of the first element in a particular use-case scenario.

10. The method of claim 1, further comprising:
    identifying a profile associated with the first hierarchy; and
    determining, from the profile, a category of a user who is interacting with the user interface, wherein the compliance rule corresponds to the category of the user.

11. The method of claim 10, wherein the category of the user identifies a first set of accessibility attributes for accessibility compliance testing according to the compliance rule, and wherein the category of the user identifies a second set of accessibility attributes to omit in the accessibility compliance testing.

12. The method of claim 1, wherein the receiving, the evaluating, and the reporting are performed at a third application in a server data processing system.

13. A computer usable program product comprising a computer readable storage device including computer usable code for evaluating compliance of a hybrid user interface design, the computer usable code comprising:
   computer usable code for receiving, from a first application executing in a client data processing system, a first hierarchy of a first type of elements of a user interface, wherein a second application presents the user interface including a set of the first type of elements and a set of a second type of elements at the client data processing system, wherein the user interface is described in an interface description, wherein the interface description comprises an organization of a set of non-native elements according to a manner of presenting the set of the non-native elements on the user interface, wherein the first hierarchy is distinct from the organization for excluding a first subset of the set of non-native elements, and wherein the non-native elements in the subset are irrelevant to an accessibility feature, the accessibility feature being governed by a compliance rule;
   computer usable code for receiving, from the first application, a second hierarchy of the second type of elements used in a system-specific presentation of the user interface at the client data processing system;
   computer usable code for determining that a first element of the first type in the first hierarchy violates a condition specified in the compliance rule;
   computer usable code for determining that a second element of the second type in the second hierarchy is related to the first element;
   computer usable code for evaluating that an attribute of the second element causes an attribute of the first element to violate the condition, wherein the attribute of the first element complies with the condition when unaffected by the attribute of the second element; and
   computer usable code for reporting, responsive to the evaluating, the second element as a cause of the first element violating the condition.

14. The computer usable program product of claim 13, further comprising:
   computer usable code for constructing the first hierarchy at the first application, wherein an element of the first type comprises a non-native element of the user interface, the non-native element being a member of the set of the non-native elements, the set of the elements of the first type forming the set of non-native elements and the first element forming a first non-native element, wherein the set of non-native elements has been coded into the user interface regardless of the system-specific presentation, the constructing comprises:
   computer usable code for detecting an event at the client data processing system;
   computer usable code for identifying the user interface as being responsive to the event;
   computer usable code for selecting the first non-native element from the interface description;
   computer usable code for identifying a first attribute of the first non-native element; and
   computer usable code for adding the first non-native element and the first attribute to the first hierarchy responsive to determining that the first attribute is usable in an accessibility compliance testing, the accessibility compliance testing being configured to test the accessibility feature according to the compliance rule.

15. The computer usable program product of claim 14, wherein the computer usable code for adding adds the first non-native element in a first location relative to a first root node of the first hierarchy, wherein the first location is distinct from a second location of the first non-native element in the organization relative to a root of the organization.

16. The computer usable program product of claim 14, wherein the organization omits a subset of the set of non-native elements, and wherein an omitted non-native element in the subset is resolved and reached from the user interface after the user interface has been presented at the client data processing system.

17. The computer usable program product of claim 13, further comprising:
   computer usable code for determining that the second element does not violate a second compliance rule corresponding to the second type of elements, wherein the reporting the second element occurs regardless of the second element not violating the second compliance rule.

18. The computer usable program product of claim 13, wherein the computer usable code is stored in a computer readable storage device in a data processing system, and wherein the computer usable code is transferred over a network from a remote data processing system.

19. The computer usable program product of claim 13, wherein the computer usable code is stored in a computer readable storage device in a server data processing system, and wherein the computer usable code is downloaded over a network to a remote data processing system for use in a computer readable storage device associated with the remote data processing system.

20. A data processing system for evaluating compliance of a hybrid user interface design, the data processing system comprising:
   a storage device, wherein the storage device stores computer usable program code; and
   a processor, wherein the processor executes the computer usable program code, and wherein the computer usable program code comprises:
   computer usable code for receiving, from a first application executing in a client data processing system, a first hierarchy of a first type of elements of a user interface, wherein a second application presents the user interface including a set of the first type of elements and a set of a second type of elements at the client data processing system, wherein the user interface is described in an interface description, wherein the interface description comprises an organization of a set of non-native elements according to a manner of presenting the set of the non-native elements on the user interface, wherein the first hierarchy is distinct from the organization for excluding a first subset of the set of non-native elements, and wherein the non-native elements in the subset are irrelevant to an accessibility feature, the accessibility feature being governed by a compliance rule;

computer usable code for receiving, from the first application, a second hierarchy of the second type of elements used in a system-specific presentation of the user interface at the client data processing system;

computer usable code for determining that a first element of the first type in the first hierarchy violates a condition specified in the compliance rule;

computer usable code for determining that a second element of the second type in the second hierarchy is related to the first element;

computer usable code for evaluating that an attribute of the second element causes an attribute of the first element to violate the condition, wherein the attribute of the first element complies with the condition when unaffected by the attribute of the second element; and computer usable code for reporting, responsive to the evaluating, the second element as a cause of the first element violating the condition.

\* \* \* \* \*